(12) United States Patent
Nix

(10) Patent No.: US 12,047,516 B2
(45) Date of Patent: *Jul. 23, 2024

(54) COMBINED DIGITAL SIGNATURE ALGORITHMS FOR SECURITY AGAINST QUANTUM COMPUTERS

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,081

(22) Filed: Feb. 2, 2023

(65) Prior Publication Data

US 2024/0121108 A1    Apr. 11, 2024

Related U.S. Application Data

(63) Continuation of application No. 17/335,223, filed on Jun. 1, 2021, now Pat. No. 11,582,045.

(60) Provisional application No. 63/033,542, filed on Jun. 2, 2020.

(51) Int. Cl.
*H04L 9/32* (2006.01)
*H04L 9/08* (2006.01)

(52) U.S. Cl.
CPC .......... *H04L 9/3249* (2013.01); *H04L 9/0852* (2013.01); *H04L 9/0877* (2013.01); *H04L 9/3252* (2013.01); *H04L 9/3263* (2013.01)

(58) Field of Classification Search
CPC ... H04L 9/3249; H04L 9/0852; H04L 9/0877; H04L 9/3252; H04L 9/3263
USPC ...................................................... 713/168
See application file for complete search history.

(56) References Cited

U.S. PATENT DOCUMENTS

| 7,707,423 B2 * | 4/2010 | Bugbee ................. H04L 9/3247 713/168 |
| 7,936,869 B2 * | 5/2011 | Beeson ............. G06Q 20/3674 380/282 |
| 8,634,559 B2 * | 1/2014 | Brown .................. H04L 9/3252 340/12.51 |
| 9,660,978 B1 * | 5/2017 | Truskovsky ........ H04L 63/0823 |
| 9,794,249 B1 | 10/2017 | Truskovsky et al. |
| 10,425,401 B1 | 9/2019 | Truskovsky et al. |

(Continued)

OTHER PUBLICATIONS

Wikipedia, "Post-Quantum Cryptography Standardization", Apr. 8, 2020.

(Continued)

*Primary Examiner* — Dereena T Cattungal
(74) *Attorney, Agent, or Firm* — GrowIP Law Group LLC

(57) ABSTRACT

A server can record (i) a first digital signature algorithm with a first certificate, and a corresponding first private key, and (ii) a second digital signature algorithm with a second certificate, and a corresponding second private key. The server can select first data to sign for the first algorithm and the first private key in order to generate a first digital signature. The server can select second data to sign, wherein the second data to sign includes at least the first digital signature. The server can generate a second digital signature for the second data to sign using the second algorithm and the second private key. The server can transmit a message comprising (i) the first and second certificates, and (ii) the first and second digital signatures to a client device. Systems and methods can concurrently support the use of both post-quantum and classical cryptography to enhance security.

15 Claims, 9 Drawing Sheets

(56) References Cited

U.S. PATENT DOCUMENTS

| | | | |
|---|---|---|---|
| 2002/0108041 A1* | 8/2002 | Watanabe | H04L 9/3249 |
| | | | 713/175 |
| 2006/0153368 A1* | 7/2006 | Beeson | H04L 9/3252 |
| | | | 380/30 |
| 2021/0377049 A1 | 12/2021 | Nix | |
| 2023/0308424 A1* | 9/2023 | Nix | H04L 9/085 |
| 2023/0336332 A1* | 10/2023 | Nix | H04L 9/0841 |

OTHER PUBLICATIONS

Crocket, et al, "Prototyping post-quantum and hybrid key exchange and authentication in TLS and SSH", National Institute of Standards and Technology (NIST) Second PQC Standardization Conference, Jul. 19, 2019.

Wikipedia, "Secure Hash Algorithms", Apr. 8, 2020.

Sikeridis, et al, "Post-Quantum Authentication in TLS 1.3: A Performance Study", Network and Distributed System Security Symposium 2020, Feb. 23, 2020.

\* cited by examiner

Figure 1
(Conventional Technology)

Server 101'

Identity.Server *101a*

Private key SK.Server *105a*

Cert.Server *102'*
- Algorithm.Signature *103*
- Isssuer: Identity.CI *104i*
- PK.Server *105*
- Parameters.PK.Server *106*
- ID-PK.CI *107* -> PK.CI *107a*
- Signature.CI *108*

---

**Certificate *102'***

Data:
    Version: 3 (0x2)
*103* →  Serial Number: a0:e6:ec:63:b7:45:8a:d9:01:5f:49:b0
    Signature Algorithm: sha256WithRSAEncryption
*104i* →  Issuer: C=BE, O=GlobalSign nv-sa, CN=GlobalSign Organization Validation CA - SHA256 - G2
    Validity
        Not Before: Nov 21 08:00:00 2020 GMT
        Not After : Nov 22 07:50:59 2022 GMT
    Subject:
        C=US, ST=Illinois, L=Evanston, O=IoT and M2M Technologies, LLC., CN=iot-and-m2m.com
    Subject Public Key Info:
*103a* →    Public Key Algorithm: id-ecPublicKey Public-Key: (256 bit)
        pub:
*105* →        Modulus: 0c:6d:46:5b:c0:1e:9d:3b:ef ... e0:a0:31:8e:d6:6c:ee:de:c3:7f:2c
*106* →        ASN1 OID: prime256v1 NIST CURVE: P-256
    X509v3 extensions: X509v3 Key Usage: critical Digital Signature
    Authority Information Access:
        CA Issuers - URI:http://secure.globalsign.com/cacert/gsorganizationvalsha2g2r1.crt
        OCSP - URI:http://ocsp2.globalsign.com/gsorganizationvalsha2g2
    X509v3 Certificate Policies:
        Policy: 1.3.6.1.4.1.4146.1.20
        CPS: https://www.globalsign.com/repository/
    X509v3 Basic Constraints:
        CA:FALSE
    X509v3 CRL Distribution Points:
        Full Name: URI:http://crl.globalsign.com/gs/gsorganizationvalsha2g2.crl
    X509v3 Subject Alternative Name:
*101a* →        DNS:www.iot-and-m2m.com
    X509v3 Extended Key Usage: TLS Web Server Authentication, TLS Web Client Authentication
    X509v3 Subject Key Identifier: 28:5e:56:5e:57:8B:3B:CE:B4:D6:AB:54:EF:D7:38:51:5C:40:5C:36
*107* →  X509v3 Authority Key Identifier: keyid:56:DA:91:F1:AD:8C:16:50:53:1C:C0:AC:79:3B:83:AA:41
*103* →  Signature Algorithm: sha256WithRSAEncryption
*108* →  9b:c3:6d:d1:0d:30:6e:af:41:72:4d:1e:18:5e:20:54:53:35: ...

URL=https://CI.net/Certs/"ID.Server 101a".p7c (cms)

Cert2.CI 201a-2
- Algorithm.Signature 103-2 (*103' + 103''*)
- Isssuer: Identity.CI 104i
- PK2.CI 107a-2
  (Lattice Public Key)
- Parameters2.PK.CI 106-2
  (Lattice Signature Algorithm)
- X509v3 Authority Key Identifier
  -ID-Cert2-Root.CI 203-2 -> Cert2-Root.CI 301a-2
- X509v3 Authority Information Access: 301
  URL=https://CI.net/Root-Certs/"Root-Certs".p7c (cms)
- Signature.CI 208-2

Cert1.CI 201a-1
- Algorithm.Signature 103-1 (*103' + 103''*)
- Isssuer: Identity.CI 104i
- PK1.CI 107a-1
  (RSA Public Key)
- Parameters1.PK.CI 106-1
  (RSA Signature Algorithm)
- X509v3 Authority Key Identifier
  -ID-Cert1-Root.CI 203-1 -> Cert1-Root.CI 301a-1
- X509v3 Authority Information Access: 301
  URL=https://CI.net/Root-Certs/"Root-Certs".p7c (cms)
- Signature.CI 208-1

301

URL=https://CI.net/Root-Certs/"Root-Certs".p7c (cms)

Cert2-Root.CI 301a-2
- Algorithm.Signature 103-2 (*103' + 103''*)
- Isssuer: Identity.CI 104i
- PK2-Root.CI 302-2
  (Lattice Root Public Key)
- Parameters2.PK.CI 106-2
  (Lattice Signature Algorithm)
- X509v3 Subject Identifier 303-2
- Signature.CI 304-2

Cert1-Root.CI 301a-1
- Algorithm.Signature 103-1 (*103' + 103''*)
- Isssuer: Identity.CI 104i
- PK1-Root.CI 302-1
  (RSA Root Public Key)
- Parameters1.PK.CI 106-1
  (RSA Signature Algorithm)
- X509v3 Subject Identifier 303-1
- Signature.CI 304-1

Figure 7
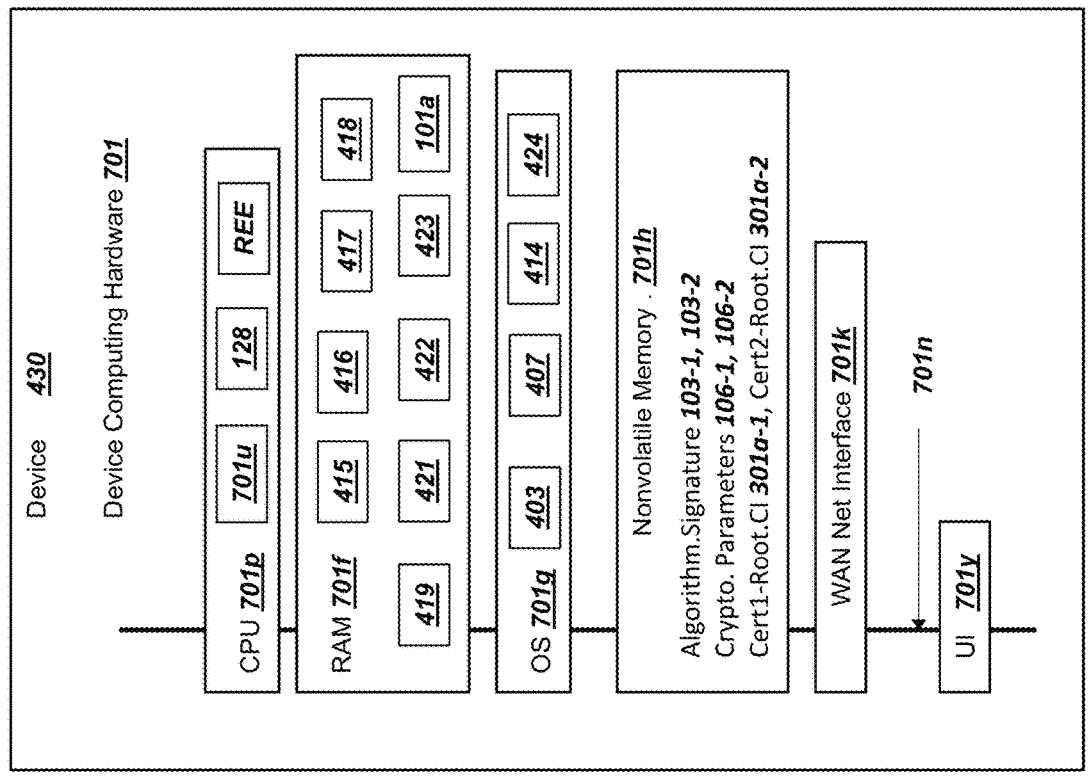
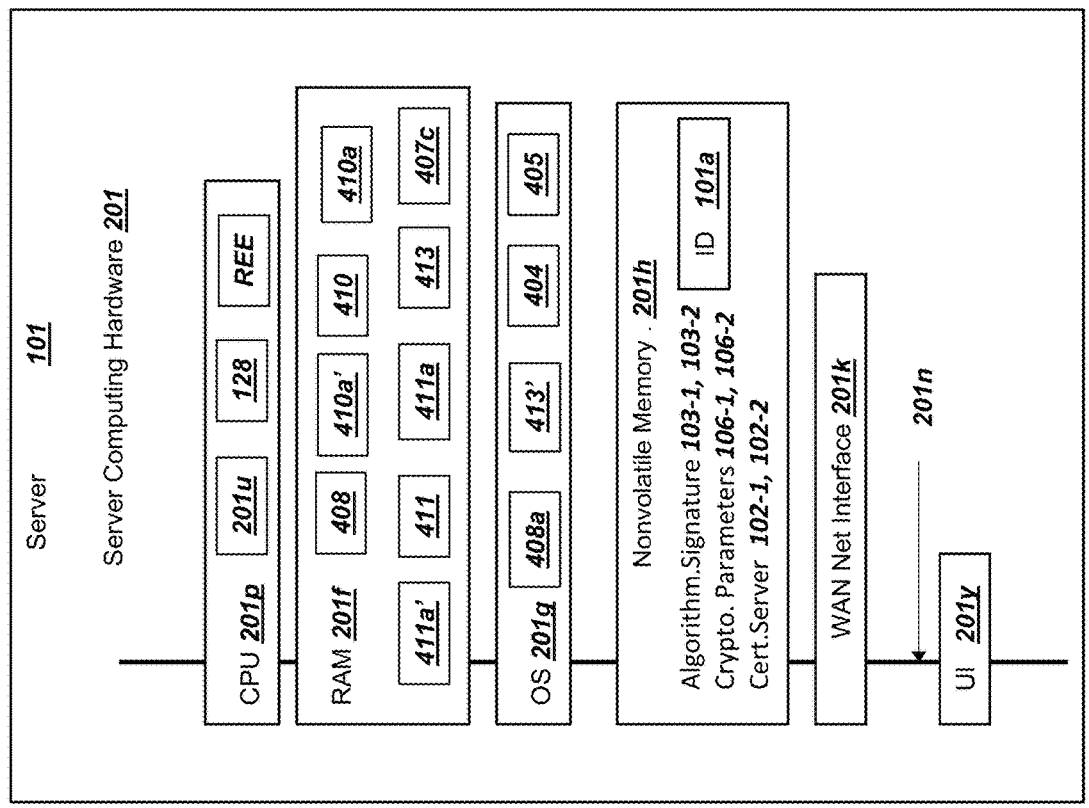

COMBINED DIGITAL SIGNATURE ALGORITHMS FOR SECURITY AGAINST QUANTUM COMPUTERS

CROSS-REFERENCE TO RELATED APPLICATION

This application is a continuation of U.S. patent application Ser. No. 17/335,223, filed on Jun. 1, 2021, which claims the benefit of U.S. Provisional Patent Application Ser. No. 63/033,542, filed on Jun. 2, 2020, both of which are hereby incorporated by reference in their entireties.

BACKGROUND

Technical Field

The present systems and methods relate to secure authentication of data transmitted and received, and more particularly to the generation and verification of digital signatures using both a first digital signature algorithm and a second digital signature algorithm.

Description of Related Art

A significant portion of authenticated communications over the Public Internet is secured by Public Key Infrastructure (PKI) and the use of X.509 certificates. Examples include Transport Layer Security (TLS), Secure Shell (SSH), IP Security (IPSec), Extensible Authentication Protocol (EAP) and other examples exist as well. These protocols provide both security from encrypting data with a shared secret and authentication of at least one of the communicating parties. Authentication is most frequently achieved through the use of digital signatures and certificates, where at least (i) one party such as a server uses a digital signature algorithm and a private key to generate a digital signature and (ii) the other party such as a client or device uses the corresponding public key to verify the digital signature. The primary algorithms used with digital signatures and the above example protocols as of 2020 are based on RSA and Elliptic Curve Cryptography (ECC) algorithms, although other examples exist as well.

For the past ~30 years, authentication protocols using the Internet have standardized on the use of X.509 certificates, where the primary current standard is version 3. The use of fields and formats of data within X.509 certificates has been standardized by the International Telecommunications Union (ITU) and the Internet Engineering Task Force (IETF), such as the Request for Comments (RFC) 5280 titled "Internet X.509 Public Key Infrastructure Certificate and Certificate Revocation List (CRL) Profile". The standard use of X.509 records (i) a single public key, (ii) parameters and/or algorithms for the single public key, (iii) a digital signature from a certificate issuer or certificate authority for the public key, (iv) algorithms used to generate the digital signature, as well as (v) an identifier of a parent certificate or public key that can be used to verify the digital signature. The X.509 certificate structure is deeply embedded in most layers of software and firmware throughout the Internet, and would be very difficult and costly to modify the existing certificate structure for most applications. A need exists in the art for new digital signature algorithms and related authentication protocols for secure sessions to fully support the widely deployed X.509 certificate structure.

Although the use of RSA and ECC digital signature algorithms are included in many different protocols and standards, quantum computers are expected to be able to solve both (i) the elliptic curve discrete logarithm problem (for ECC algorithms) and (ii) the integer factorization problem (for RSA algorithms) in polynomial time, while classical computers solve the problem in exponential time. As of early 2020, estimates for the number of qubits required to break a 256 bit ECC public key to determine the private key with a reasonable computation time are approximately 2000-4000 qubits. Estimates for the number of qubits required to break a 3072 bit RSA based PKI public key to determine the private key are approximately 4000-8000 qubits. Industry projections of the number of qubits for operating quantum computers shows this number of qubits could be available for a computing device in approximately 5 to years and likely within 15 years. However, a comprehensive change across the Internet of digital signature algorithms from RSA or ECC algorithms to entirely new and relatively unproven but "quantum safe" post-quantum cryptographic algorithms will also likely require more than a decade.

The National Institute of Standards and Technology (NIST) is currently conducting a project for Post-Quantum Cryptography Standardization. The field of post-quantum cryptography continues to develop with proposed algorithms currently undergoing revisions for standardization as of May 2020. In general, the leading candidates for post-quantum cryptography digital signature algorithms propose using lattice, multivariate, or hash-based, algorithms. These proposed algorithms are described by the Wikipedia article for "Post-Quantum Cryptography" dated Apr. 7, 2020, which is hereby incorporated by reference. MST supported standards for quantum-safe cryptographic algorithms are expected to be published around 2024.

The transition from RSA and ECC based digital signature algorithms to quantum-safe cryptographic algorithms will require both (i) a significant level of effort from technology vendors and service providers, and (ii) acceptance of new levels of uncertainty for dependence on the new "quantum-safe" algorithms. The proposed candidates for "quantum-safe" algorithms are not generally proven to be secure against quantum computers, although they are believed to be secure. Since the field of quantum computing is developing so rapidly, it is possible that quantum computers could also break lattice or multivariate based cryptography in the future. In addition, new algorithms for classical computers could be developed to break or reduce the security of algorithms currently considered "quantum-safe".

RSA and ECC have decades of detailed study without finding polynomial time solutions for breaking public keys (e.g. finding the corresponding private key), so are well understood and reasonably believed safe for classical computers. A need exists in the art for servers to generate digital signatures using at least a first and second digital signature algorithm, such that if the first algorithm is broken and the second algorithm remains reasonably secured, then the digital signature can still remain secured (e.g. trusted). A need exists in the art for the use of the existing X.509 infrastructure to support the use of two digital signature algorithms for devices to authenticate servers. A need exists in the art for the authentication of server data to be stronger or more secure than separately generating two digital signatures using two digital signature algorithms for the same or equivalent message to sign/verify.

A significant complexity for migrating protocols such as TLS to support post-quantum cryptography relates to making the protocols as "backwards compatible" as possible. A significant delay for the formal approval of TLS version 1.3 related to adjusting the final protocol specification to support widely deployed "middle boxes" and firewalls which read and process the data between a client and a server. When new fields or structures were initially proposed or introduced for TLS 1.3, deployment of the protocol was inhibited by the existing use of "middle boxes" and firewalls which (i) supported the earlier version of TLS 1.2 but (ii) did not properly interpret or read values within TLS 1.3. The equivalent problem is very likely to arise for future versions of TLS and other secure session protocols, where new fields and values need to be introduced to support post-quantum cryptographic algorithms. A need exists in the art for changes to protocols to support post-quantum cryptography and also supporting the use of two digital signature algorithms to be as "backward compatible" as possible. In other words, a need exist in the art for the use of two digital signature algorithms for server authentication to fully support existing fields and data structure for TLS version 1.3. A need exists in the art for secure session protocols to continue supporting the existing, deployed "middle boxes" and firewalls that otherwise might inhibit the migration for concurrent support of post-quantum cryptographic algorithms and classical cryptographic algorithms.

Many other examples exist as well for needs in the art for the secure use of two digital signature algorithms for the establishment of secure sessions over packet switched networks and the Internet, and the above are examples are just a few and intended to be illustrative instead of limiting.

SUMMARY

Methods and systems are provided for the secure use of both a first digital signature algorithm and a second digital signature algorithm with communications between a computing device and a server. The methods and systems provided can address exemplary needs in the art described above and other benefits are available as well, including increasing the security from using both a first digital signature algorithm and a second digital signature algorithm. In exemplary embodiments, (i) a first digital signature algorithm can comprise a classical digital signature algorithm such as based on RSA or ECC algorithms, and (ii) the second digital signature algorithm can comprise a digital signature algorithm supporting post-quantum cryptography (PQC), such as based on lattice, code, multivariate, or hash algorithms. Or, the first digital signature algorithm can support post-quantum cryptography and the second digital signature algorithm can support classical digital signature algorithms. In another embodiment, the first digital signature algorithm can support a first PQC algorithm (such as, but not limited to, based on lattices) and the second digital signature algorithm can support a second PQC algorithm (such as, but not limited to, based on multivariate algorithms).

An exemplary system can include a computing device, a server, and a certificate issuer. The server can include computing hardware, where computer hardware can comprise electrical components for processing, storing, sending or transmitting, and receiving data, including communication with other nodes via data networks. For some exemplary embodiments, a server can comprise a virtual machine operating on a host, where the host includes computing hardware. Computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions for a processor in the device in order to communicating with the server. Both the device and the server can store cryptographic algorithms for processing both the first digital signature algorithm and the second digital signature algorithm. Both the device and the server can store a first set of parameters associated with the first digital signature algorithm and a second set of parameters associated with the second digital signature algorithm.

The server can store a first server certificate for the first digital signature algorithm and a second server certificate for the second digital signature algorithm. Both the first and second server certificates could be signed by the certificate authority. The first server certificate can include a first server public key and the second server certificate can include a second server public key. The device can process and generate a first message for the server, where the first message could support a protocol for establishing a secure session between the device and the server. The protocol could support communication standards such as IP Security (IPSec), Datagram Transport Layer Security (DTLS) with UDP messages, Secure Shell (SSH), and Transport Layer Security (TLS) and other possibilities exist as well. In exemplary embodiments, the first message could comprise a "Client Hello" message to the server. The first message can specify the support by the device of both the first digital signature algorithm and the second digital signature algorithm. The first message can include device extensions that specify parameters and values supported by the computing device, as well as a device ephemeral public key generated by the device. The device ephemeral public key can also be referred to as a device key share.

The server can receive the first message and use the server computing hardware to generate a response second message. In some exemplary embodiments, the response second message could comprise a "Server Hello" message. The server can use the received extensions from the client device in the first message to select server extensions and cryptographic parameters for the response second message. The server can generate a first "message to sign" or "data for signature" comprising at least (i) a server key share which could comprise an ephemeral public key for the server, (ii) the selected server extensions, and (iii) the first and second server certificates. The server can use (i) the first digital signature algorithm, (ii) a first private key corresponding to a first public key in the first server certificate, and (iii) the first message to sign in order to generate a first digital signature. For some exemplary embodiments, the first "message to sign" or "data for signature" can also include the device key share and a random number generated by the device.

The server can generate a second "message to sign" or "data for signature" comprising at least (i) a server key share value (which could be either a server ephemeral public key), (ii) the selected server extensions, (iii) the first and second server certificates, and (iv) the first digital signature. For exemplary embodiments, the second "message to sign" or "data for signature" can comprise (i) the first "message to sign" or "data for signature" and the first digital signature. The server can use (i) the second digital signature algorithm, (ii) a second private key corresponding to a second public key in the second server certificate, and (iii) the second message to sign in order to generate a second digital signature. Note that the second digital signature can be generated over at least the first digital signature, where the first digital signature algorithm was used to generate the first digital signature and the second digital signature algorithm is used to generate the second digital signature.

By including the first digital signature within the second "message to sign" for the second digital signature, security of systems with the device and server can be increased by directly linking the two digital signatures. Other benefits are achieved as well, including (i) increasing the information entropy input or used to derive the second digital signature, and (ii) increasing compatibility for existing, deployed software for generating (by a server) and verifying (by a device) a "CertificateVerify" (or equivalent). The server can include the second digital signature in a "CertificateVerify" field or value for the response second message. In some exemplary embodiments, the "CertificateVerify" field or value for the response second message can include both the second digital signature and the first digital signature.

In other exemplary embodiments, the "CertificateVerify" field or value for the second response message can include only the second digital signature. The first digital signature can be either (i) included in the second response message outside or external to the "CertificateVerify" field or value, such as, but not limited to, within the server extensions, or (ii) omitted from a "Server Hello" message. Even for embodiments where the first digital signature is omitted from a "Server Hello" message (and the second digital signature is included in the "CertificateVerify" field, a device can verify both the first digital signature and second digital signature were properly generated by the server (since the first digital signature can be used to generate the second digital signature).

For some embodiments where the full first digital signature is required to be received in order to even generate a first digital signature (such as with RSA signatures), then the computing device can receive the first digital signature within the response second message in order to verify the first digital signature. The computing device and server can conduct additional steps with an exchange of at least one key share and (i) a key exchange algorithm in order to mutually derive a shared secret or (ii) a key encapsulation mechanism (KEM) for the secure and encrypted exchange of data to derive a shared secret. The shared secret can be used to encrypt data between the computing device and the server. In exemplary embodiments, the server key share can be encrypted using the shared secret. The server can send the second response message to the computing device, and the second response message can comprise a "Server Hello" message. The "Server Hello" message can include selected digital signature algorithms, server extensions, the server identity, the server key share, and the first and second digital signatures within ciphertext encrypted using the shared secret.

The computing device can receive the second response message and conduct steps to process the second response message and authenticate the server using both the first digital signature algorithm and the second digital signature algorithm. The device can use either (i) the key exchange algorithm or (ii) the key exchange mechanism with a device private key corresponding to the device public key as the device key share in order to obtain a shared secret. The device can use the shared secret to convert ciphertext in the second response message to plaintext. From the plaintext, the device can process or generate a first "message to verify" or "data for signature" which can be identical to the first "message to sign" used by the server. The first "message to verify" can comprise at least (i) the server key share, (ii) the received server extensions, and (iii) the first and second server certificates. In exemplary embodiments, the first "message to verify" can also include the device key share and a random number generated by the device and included in the first message. The client can use (i) the first digital signature algorithm, (ii) the first public key in the first server certificate, (iii) the first message to verify, and (iv) the received first digital signature in order to verify the first digital signature.

The device can process a second "message to verify" or "data for signature" comprising at least (i) the server key share value, (ii) the received server extensions, (iii) the first and second server certificates, and (iv) the first digital signature. In exemplary embodiments, the second "message to verify" can comprise the first message to verify and the first digital signature. The device can use (i) the second digital signature algorithm, (ii) the second public key in the second server certificate, (iii) the second message to verify, and (iv) the received second digital signature in order to verify the second digital signature. The device can also conduct additional verification of (i) the first server certificate with the first digital signature algorithm and a stored first certificate issuer certificate or root certificate and (ii) the second server certificate with the second digital signature algorithm and a stored second certificate issuer certificate or root certificate.

Upon verification of the second digital signature, plus verification of the first and second server certificates, the server can be considered authenticated with the device using both the first digital signature algorithm and the second digital signature algorithm. The device and server can conduct additional steps such as (i) deriving a master secret using the shared secret and data exchanged and (ii) encrypting application data using the master secret.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1 is a graphical illustration of a server and a server certificate, in accordance with conventional technology;

FIG. 3 is a graphical illustration of exemplary certificate issuer certificates, in accordance with exemplary embodiments;

FIG. 7 is a graphical illustration of hardware, firmware, and software components for a server and a device, in accordance with exemplary embodiments.

DETAILED DESCRIPTION OF EXEMPLARY EMBODIMENTS OF THE INVENTION

FIG. 1

Figure 2:
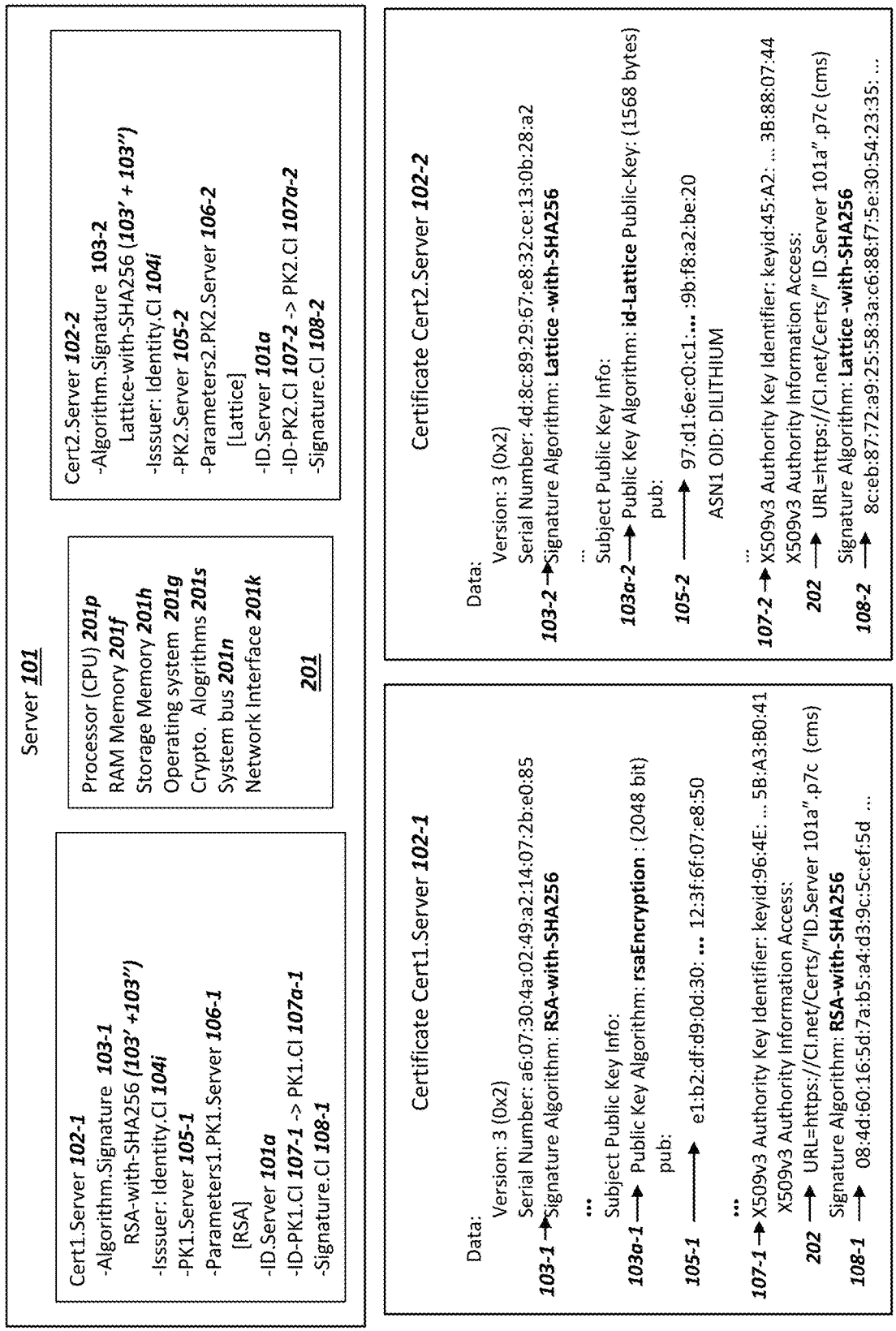
FIG. 2 is a graphical illustration of an exemplary server and exemplary server certificates, in accordance with exemplary embodiments.

FIG. 1 is a graphical illustration of a server and a server certificate, in accordance with conventional technology. The graphical illustration of a server 101' and a server certificate 102' is exemplary. The server can comprise a server 101' and the server certificate can comprise a certificate cert.server 102'. Server 101' can comprise a sever supporting communications with a plurality of clients and operate software supporting secured communications across the Internet or possibly a private network as well. Server 101' can include a server identity comprising identity.server 101a, which would be a domain name, IP address, medium access control (MAC) address, virtual instance identifier, etc. Server 101' could operate as a virtual machine on a host computer, where the host computer includes standard components such as a processor, network interfaces such as Ethernet, random access memory, and non-volatile memory. Server 101' could also be a physical, rack-mounted server within a network. Server 101' could operate within a cloud network as well.

Server 101' could comprise a server supporting secure and authenticated communications protocols such as TLS, SSH, EAP, IPSec, Virtual Private Networks (VPN), and other possibilities exist as well. As depicted in FIG. 1, server 101' can include a server certificate cert.server 102', which can comprise a certificate supporting the X.509 family of standards, including X.509 version 3. Server 101' can securely store a private key SK.Server 105a (such as in protected memory or with restricted access), where the private key SK. Server 105a corresponds to a public key 105 described below. Digital signatures can be generated using the private key SK.Server 105a, and the digital signatures can be verified by parties receiving the digital signatures using the public key 105 in a certificate 102'.

An example server certificate cert.server 102' is depicted in FIG. 1. The certificate cert.server 102' can also be referred to herein as certificate 102'. Certificate 102' can include a plurality of fields supporting widely deployed software and firmware for authenticating digital signatures generated by server 101'. The fields and data within certificate 102' could be specified by IETF RFC 5280, including subsequent and related versions of the standard. The certificate 102' depicted in FIG. 1 is for use with TLS, but other standards could be supported as well. Some fields and values within a certificate 102' have been omitted, and other fields commonly used could be included as well. The full length of keys and data have been truncated or shortened for depiction purposes, where the depicted value of " . . . " means that the full string of hexadecimal data is not displayed.

A certificate 102' can include a signature algorithm 103. With conventional technology, the signature algorithm 103 can support (i) the Digital Signature Algorithm (DSA) as specified in Federal Information Processing Standard (FIPS) 186, (ii) the RSA digital signature algorithm as described in IETF RFC 4055 titled "Additional Algorithms and Identifiers for RSA Cryptography for use in the Internet X.509 Public Key Infrastructure Certificate and Certificate Revocation List (CRL) Profile", or (ii) ECC based digital signature algorithms such as the Elliptic Curve Digital Signature Algorithm (ECDSA). Other possibilities exist as well for digital signature algorithms specified by a signature algorithm 103 in a certificate 102'. Conventional technology with X.509 certificates and standard protocols such as TLS, SSH, IPSec, EAP, and VPNs support the specification of both (i) a single digital signature algorithm 103 and (ii) a single public key 105 within a certificate 102'.

A certificate 102' can include an identity for a certificate issuer comprising identity.CI 104i. The identity.CI 104i can include strings or values to identify a certificate issuer, such as a name, location, etc. Note that the identity.CI 104i can also include cryptographic parameters in the name, such as the name of the certificate issuer being dedicated to or associated with a specific algorithm or parameters such as the use of a specific secure hash algorithm or digital signature algorithm. The exemplary identity. CI 104i can describe the entity issuing the certificate. Additional data in the certificate 102' will be associated with the certificate issuer using identity.CI 104i, such as policies, the authority key identifier, etc. In general, a device receiving the certificate 102' can verify the received certificate with another, parent certificate securely stored and associated with the certificate issuer using identity.CI 104i.

A certificate 102' can also include a server public key 105. The public key 105 in certificate 102' is for server 101' also depicted in FIG. 1. The public key 105 can correspond to the private key SK.Server 105a. A key pair generation algorithm supporting parameters 106 could be used to generate the public key 105. Parameters 106 can specify values and settings for use with the public key 105, such as values for an elliptic curve cryptography (ECC) curve name (for ECC keys), RSA modulus (for RSA keys), key length, key formatting (e.g. compressed or uncompressed), encoding rules, etc. For use of ECC algorithms, parameters 106 can specify elliptic curve names such as, but not limited to MST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. A certificate 102' can specify a digital signature algorithm 103a for use with the server public key 105. In some embodiments, the digital signature algorithm 103a for use with the server public key 105 can be different than the digital signature algorithm 103 used to verify the certificate 102'.

Parameters 106 can specify domain parameters for nodes to calculate digital signatures in a compatible manner, such as common base point G for use with ECC PKI key pairs and a defining equation for an elliptic curve. With RSA based signatures, parameters 106 can specify values for padding in order to generate a digital signature. Note that separate parameters from those specified by parameters 106 in a certificate 102' may be agreed by nodes using the certificate 102'. In other words, when parameters 106 are used in the present disclosure, such as with parameters 106 with processing digital signatures in FIGS. 4a, 4b, 4c, 5, and 6 below, the parameters within a certificate 102' can be a subset of the parameters 106 used with the digital signature algorithm. A first portion of the parameters 106 can be in a certificate 102' and a second portion of the parameters 106 could be mutually agreed between communicating nodes based on other means (such as specified in the communications protocol).

A certificate 102' can include the server identity 101a, such that the identity of a server can be verified using the certificate 102'. Certificate 102' can also include an authority key identifier which can be an identity for a public key from the certificate issuer 104 used to verify the digital signature 108 in a certificate 102'. FIG. 1 depicts the authority key identifier as ID-PK.CI 107. The depicted value of "–>" for a certificate 102' in a server 101' indicates the value of ID-PK.CI 107 can be used as a reference by the receiver of a certificate 102' in order to query or lookup the public key used to generate the digital signature 108. A certificate 102' will also include a digital signature 108, where the digital signature 108 was generated by (i) the digital signature algorithm 103 and (ii) the private key for the public key specified by ID-PK.CI 107 over (iii) all previous data in the certificate 102' before the signature 108. The generation and verification of digital signatures will be described in additional detail in subsequent figures below.

FIG. 2

FIG. 2 is a graphical illustration of an exemplary server and exemplary server certificates, in accordance with exemplary embodiments. Server 101 can include the functions of a server 101' depicted and described in connection with FIG. 1, but with the additional features and functionality described in FIG. 2 and subsequent Figures of the present disclosure. Server 101 can include at least one processor 201p, random access memory (RANI) 201f, storage memory 201h, cryptographic algorithms 201s, a network interface 201k, and at least two certificates comprising a first certificate 102-1 and a second certificate 102-2.

Server 101 can include computing hardware 201, where computer hardware 201 can comprise electrical components for processing, storing, sending or transmitting, and receiving data, including communication with other nodes via data networks. For some exemplary embodiments, server 101 can comprise a virtual machine operating on a host, where the host includes computing hardware 201. Additional details for the electrical components operating within a server 101 are depicted and described in connection with FIG. 7 below.

Computing hardware 201 can include at least one processor 201p in order to store and record data as well as communicate with other nodes over an IP network, such as with a device 430 and IP network 401 depicted in FIG. 4a below. Processor 201p can also be referred to as a central processing unit (CPU) 201p. Processor 201p can comprise a general purpose processor appropriate for the computational requirements for a server 101, and may operate with multiple different processor cores, including field programmable gate arrays (FPGA). A processor 201p can comprise exemplary ARM® based processors or an Intel® based processor such as belonging to the XEON® family of processors, and other possibilities exist as well. Processor 201p can utilize a data bus to fetch instructions from RAM memory 201m or storage memory 201r within a server 101 and operate on the instruction. A processor 201p can include components such as registers, accumulators, and logic elements to add, subtract, multiply, and divide numerical values and record the results in memory. In exemplary embodiments, at least one processor 201p within server 101 and computing hardware 201 can be used to conduct the steps for signature generation depicted in FIGS. 4a, 4b, and 5 below.

RAM 201f may comprise a random access memory for server 101 and computing hardware 201. RAM 201f can be a volatile memory providing rapid read/write memory access to processor 201p. RAM 201f could be located on a separate integrated circuit in server 101 or computing hardware 201. The RANI 201f can include data recorded or stored in server 101 for operation when communicating with other nodes as depicted in FIG. 4a below, where RAM 201f can store data in memory within a volatile state (such that RAM 201f is flushed if electrical power is removed from server 101). The RANI 201f can include data recorded or stored in server 101 for conducting the steps for signature generation depicted in FIGS. 4b and 5b below.

The system bus 201n in computing hardware 201 may be any of several types of bus structures including a memory bus or memory controller, a peripheral bus, and a local bus using any of a variety of bus architectures including a data bus. System bus 201n connects components within server 101, such as transferring electrical signals between the components for computing hardware 201 illustrated for a server 101. Server 101 can include multiple different versions of bus 201n to connect different components, including a first system bus 201n between CPU 201p and RAM 201f (which could be a memory bus), and a second system bus 201n between CPU 201p and network interface 201k, which could be an I2C bus, an SPI bus, a PCI bus, or similar data busses.

Figure 4A:
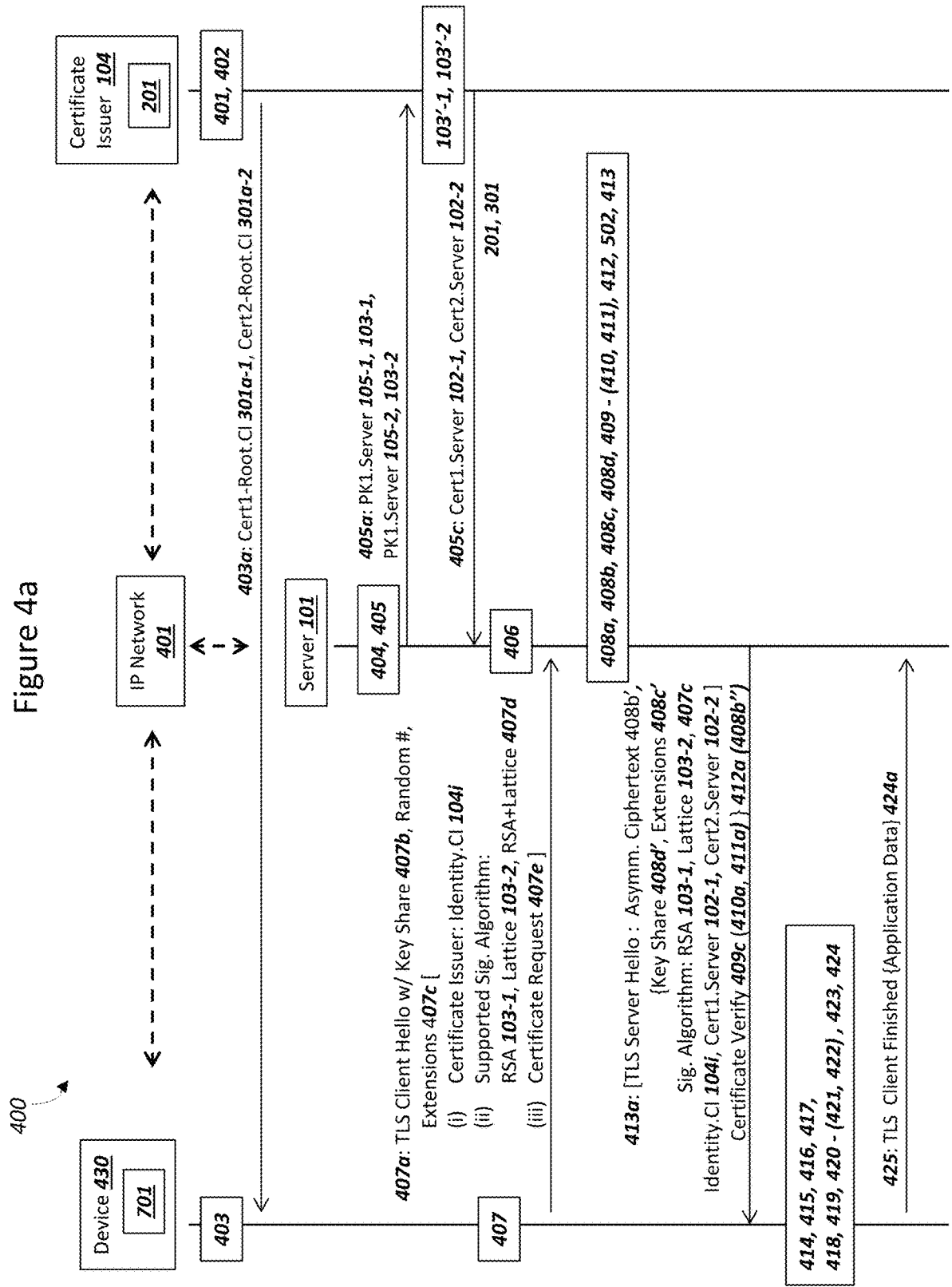
FIG. 4a is a simplified message flow diagram illustrating an exemplary system with exemplary steps and exemplary data sent and received by a device, a server, and a certificate issuer, in accordance with exemplary embodiments.

Server 101 may also operate a network interface 201k, where network interface 201k can be used to connect and communicate with other nodes such as depicted in FIG. 4a below. Network interface 201k can comprise a physical interface connected to system bus 201n for server 101. In exemplary embodiments, network interface 201k can comprise an Ethernet or fiber optic wired connection. Network interface 201k can connect server 101 to plurality of computing devices and other servers through networks such as the globally routable public Internet. Network interface 201k may also be referred to herein as a WAN interface 201k.

Nonvolatile memory 201h or "storage memory" 201h (which can also be referred to herein as "memory 201h") within server 101 can comprise a non-volatile memory for long-term storage of data, including times when server 101 or computing hardware 201 may be powered off. Storage memory 201h may be a NAND flash memory or a NOR flash memory and record firmware for server 101, such as a bootloader program and an operating system. Storage memory 201h can record long-term and non-volatile storage of data or files for server 101. In exemplary embodiments, the server certificates 102-1 and 102-2 are recorded in storage memory 201h when server 101 is powered off, and the server certificates 102-1 and 102-2 along with corresponding private keys are moved by CPU 201p into RANI 201f when server 101 powers on. Storage memory 201h can operate as a traditional hard disk drive or a solid state drive (SSD). Storage memory 201h can also comprise a plurality of spinning hard disk drives in a redundant array of independent disks (RAID) configuration. Storage memory 201h may also be referred to as "server storage" and can include exemplary file systems of FAT16, FAT 32, NTFS, ext3, ext4, UDF, or similar file systems. As contemplated herein, the terms "memory 201h", "storage memory 201h", and "nonvolatile memory 201h" can be considered equivalent.

Cryptographic algorithms 201s can include the steps and logic for processor 201p in server 101 and computing hardware 201 to conduct in order for server 101 to securely communicate with other nodes, including a device 430 as depicted and described in connection with FIG. 4a below. Cryptographic algorithms 201s can include at least symmetric ciphering algorithms, a random number generator, a key pair generation algorithm for PKI keys, digital signature algorithms, asymmetric ciphering algorithms, secure hash algorithms, and key exchange/key encapsulation algorithms. Cryptographic algorithms 201s can also support post-quantum cryptography, such as any of the exemplary algorithms listed in the Wikipedia article for "Post-Quantum Cryptography Standardization" as of Apr. 7, 2020, including Round 2. Cryptographic algorithms 201s can also support RSA and ECC based digital signature algorithms, including both the generation of digital signatures and the verification of digital signatures. Cryptographic algorithms 201s can include the machine instructions for processor 201p to conduct the steps for server 101 using computing hardware 201 depicted and described in connection with in FIGS. 4a, 4b, and 5 below.

Cryptographic algorithms 201s can also include a key verification step for verifying that a received public key is valid for an ECC curve. Cryptographic algorithms 201s can use libraries available from example cryptographic suites such as OpenSSL, crypto++, BouncyCastle, or Mozilla, and other possibilities exist as well without departing from the scope of the present disclosure. Cryptographic algorithms 201s can use inputs of keys such as public keys, private keys, and/or symmetric keys along with cryptographic parameters 106 in order to for server 101 to process cryptographic data including ciphertext, key exchanges or key encapsulation mechanisms (KEM), and digital signatures. The candidates for post-quantum cryptography standardization in Round 2 of the MST evaluation have included example code for processing digital signatures, and that code could be included within cryptographic algorithms 201s within server 101.

Server 101 can include at least two server certificates comprising a first certificate cert1.server 102-1 and a second certificate cert2.server 102-2. A first certificate cert1.server 102-1 can be referred to herein as a first server certificate 102-1, and likewise, a second certificate cert2server 102-c can be referred to herein as a second server certificate 102-2. Both the first server certificate 102-1 and second server certificate 102-2 can comprise certificates fully compatible with X.509v3 standards. The first server certification 102-1 and the second server certificate 102-2 can include customizations and the specific use of fields or values within a server certificate cert.server 102' from conventional technology as depicted and described above in FIG. 1. The signature algorithm for both the first certificate cert1.server 102-1 and the second certificate cert2.server 102-2 can comprise a different signature algorithm 103, such as the use of a first digital signature algorithm 103-1 for the first server certificate 102-1 and the use of a second digital signature algorithm 103-2 for the second server certificate.

As contemplated herein and depicted in FIG. 2, a digital signature algorithm 103' can comprise an algorithm for generating digital signatures using a private key and a digital signature algorithm 103" can comprise an algorithm for verifying digital signatures using the corresponding public key. In other words, a digital signature algorithm 103 can use both a digital signature algorithm 103' for one node to generate digital signatures using a private key and a digital signature algorithm 103" to verify digital signatures using a corresponding public key. Digital signature algorithms 103' and 103" can use equivalent or compatible sets of cryptographic parameters 106, which can be included with a certificate 102 for a public key 105. The use of a digital signature algorithm 103' for generating digital signatures is depicted and described in connection with FIG. 4a below. The use of a digital signature algorithm 103" for verifying digital signatures is depicted and described in connection with FIG. 4b below.

Signature algorithm 103 in both server certificates 102-1 and 102-2 can specify the use of both (i) a first digital signature algorithm with a first public key 107a-1 and (ii) a second digital signature algorithm with a second public key 107a-2 in order to independently and or separately verify each of (i) digital signature 108-1 in cert1.server 102-1 and (ii) digital signature 108-2 in cert2.server 102-2. First signature algorithm 103-1 is depicted in FIG. 1b as "RSA-with-SHA256", as one exemplary embodiment, and the use of other digital signature algorithms are possible as well. The depiction of second signature algorithm 103-2 indicates the signature algorithm 103-2 comprises a lattice-based signature algorithm. "Lattice" is depicted as an example to represent a class of algorithms, where "Lattice" could comprise a Round 2 of NIST PQC standardization lattice-based algorithm such as, but not limited to, CRYSTALS-DILITHIUM, FALCON, and qTESLA. A signature algorithm 103 for a server 101 can include both a signature generation algorithm 103' using a private key and a signature verification algorithm 103" using a public key corresponding to the private key.

Other possibilities exist as well for the use of a first signature algorithm and a second signature algorithm for a signature algorithms 103-1 and 103-2 without departing from the scope of the present invention. Note that signature algorithms 103 may also specify a secure hash algorithm to be used, such as SHA-256, SHA-512, SHA-3(256), SHA3-(384), etc. Exemplary secure hash algorithms for the signature algorithms 103 in the present invention can belong to the SHA-2 and SHA-3 families of secure hash algorithms. The SHA-2 and SHA-3 families of algorithms are described in the Wikipedia article for "Secure Hash Algorithms" dated Apr. 8, 2020, which is herein incorporated by reference. A first server certificate 102-1 can include a first certificate issuer identity 104i and a second server certificate 102-2 can include a second certificate issuer identity 104i. In some embodiments, the certificate issuer identity 104i for the first server certificate 102-1 and second server certificate 102-2 can be the same. In other embodiments, the certificate issuer identity 104i for the first server certificate 102-1 and second server certificate 102-2 can comprise different values or related values. For these other embodiments, the certificate issuer identity 104i can be associated with or use the digital signature algorithm in the name of the certificate issuer identity 104i such as "CI-RSA", "CI-CRYSTALS", etc.

A first server certificate 102-1 can include a first public key 105-1 supporting digital signature algorithm 103-1 and parameters 106-1. A second server certificate 102-2 can include a second public key 105-2 supporting digital signature algorithm 103-2 and parameters 106-2. Parameters 106-1 can correspond to digital signature algorithm 103-1 and parameters 106-2 can correspond to digital signature algorithm 103-2. The first and second server certificates 102-1 and 102-2 can include a server identity of ID.server 101a. In some embodiments, server identity ID.server 101a in the first and second server certificates 102-1 and 102-2 can comprise the same value, such as a domain name and/or a common name (CN) within an X.509v3 certificate.

The first server certificate 102-1 can include a first Authority Key Identifier or an identity for the certificate issuer public key used to verify the first server certificate 102-1, where the first Authority Key Identifier can comprise the identify for the certificate issuer public key of ID-PK1.CI 107-1. The second server certificate 102-1 can include a second Authority Key Identifier or an identity for the certificate issuer public key used to verify the second server certificate 102-2, where the second Authority Key Identifier can comprise the identify for the certificate issuer public key of ID-PK2.CI 107-2. The values or identities for the certificate issuer public keys of ID-PK1.CI 107-1 and ID-PK2.CI 107-2 can be used with an Authority Information Access value in order for the recipient of a server certificate to lookup or query for the corresponding certificate issuer public keys 107a-1 and 107a-2.

In exemplary embodiments, the server certificates 102-1 and 102-2 can include an Authority Information Access value 202 comprising a uniform resource indicator (URI) or uniform resource locator (URL) for a file or files which contain (i) the identity for the certificate issuer public key of ID-PK1.CI 107-1 and the corresponding certificate issuer public key 107a-1 and (ii) the identity for the certificate issuer public key of ID-PK2.CI 107-2 and the corresponding certificate issuer public key 107a-2. In exemplary embodiments, the data or files referenced by an Authority Information Access value 202 can be sent by a server 101 along with the server certificates 102-1 and 102-2.

A first server certificate 102-1 can include a first Authority Information Access value 202 and a second server certificate 102-2 can include a second Authority Information Access value 202. In some embodiments the file specified by the first and second Authority Information Access value 202 can (i) all of the identities for the certificate issuer public keys of ID-PK1.CI 107-1 and ID-PK2.CI 107-2 and (ii) the corresponding certificate issuer public keys 107a-1 and 107a-2 (such as in separate certificates as depicted in the cms file in FIG. 3 below). For these embodiments described in the previous sentence, the Authority Information Access value 202 in the first server certificate 102-1 and the second server certificate 102-2 can comprise the same value. In other embodiments, (i) a first Authority Information Access value 202 in a first server certificate 102-1 can include the identity for the certificate issuer public key of ID-PK1.CI 107-1 and the corresponding certificate issuer public key 107a-1 and (ii) a second Authority Information Access value 202 in a second server certificate 102-2 can include the identity for the certificate issuer public key of ID-PK2.CI 107-2 and the corresponding certificate issuer public key 107a-2.

As depicted in FIG. 2, the first server certificate 102-1 can include a first digital signature 108-1 using the first certificate issuer public key 107a-1 and the first digital signature algorithm 103-1. The second server certificate 102-2 can include a second digital signature 108-2 using the second certificate issuer public key 107a-2 and the second digital signature algorithm 103-2. In FIG. 2, the server certificates 102-1 and 102-2 are depicted at the top of FIG. 2 as stored within server 101, and the sever certificates 102-1 and 102-2 are depicted at the bottom of FIG. 2 with additional exemplary data.

FIG. 3

FIG. 3 is a graphical illustration of exemplary certificate issuer certificates, in accordance with exemplary embodiments. As contemplated herein a certificate issuer can also comprise a certificate authority. Certificate issuer certificates 202a-1 and 202a-2 can be stored in a file for the Authority Information Access 202 specified in a server certificate 102-1 and 102-2. Although the Certificate issuer certificates 202a-1 and 202a-2 are depicted as stored in the same file for Authority Information Access 202, separate files for Authority Information Access 202 could be used to store the Certificate issuer certificates 202a-1 and 202a-2. In other words, a first server certificate 102-1 could specify a first file or location for a first Authority Information Access 202, and a second server certificate 102-2 could specify a second file or location for a second Authority Information Access 202.

The exemplary file for Authority Information Access 202 is depicted in FIG. 3 with a URL of "https://CI.net/CertsrID-.Server 101a".p7c". The file could be formatted according to text, binary data, hexadecimal data, and could comprise a file supporting the PKCS #7 format defined in IETF RFC 2315. The file could also be formatted according to Cryptographic Message Syntax as specified in IETF RFC 5272. Other possibilities exist as well for multiple certificates to be included in a file or data for Authority Information Access 202 without departing from the scope of the present disclosure.

A first certificate issuer certificate 202a-1 can include a first digital signature algorithm 103-1 and a first certificate issuer identity 104i. A second certificate issuer certificate 202a-1 can include a second digital signature algorithm 103-2 and the certificate issuer identity 104i. In some embodiments, the certificate issuer identity for the first and second certificates 202a-1 and 202a-2 can be different. The first certificate issuer certificate 202a-1 can include a first certificate issuer public key PK2.CI 107a-1 and a first set of parameters Parameters2.PK.CI 106-1. The first certificate issuer certificate 202a-1 can correspond to the first server Certificate Cert1.Server 102-1. The second certificate issuer certificate 202a-2 can include a second certificate issuer public key PK2.CI 107a-2 and a second set of parameters Parameters2.PK.CI 106-2. The second certificate issuer certificate 202a-2 can correspond to the second server Certificate Cert1.Server 102-2.

Certificate issuer certificates 202a-1 and 202a-2 can also each include an authority key identifier 107-1 and 107-2 which can be an identity for a public key from the certificate issuer 104 used to verify the digital signatures 208-1 and 208-2 in each certificate. FIG. 3 depicts and exemplary embodiment where certificate issuer certificates 202a-1 and 202a-2 can be verified by certificate issuer root certificates. For other embodiments, additional layers of certificate issuer certificates can be used to verify certificate issuer certificates 202a-1 and 202a-2 through certificate issuer root certificates.

The first certificate issuer certificate 201a-1 can include a first Authority Key Identifier or an identity for the certificate issuer public key used to verify the first certificate issuer certificate 201a-1, where the first Authority Key Identifier can comprise the identify for the certificate issuer root public key of ID-Cert2-Root.CI 203-1. The second certificate issuer certificate 201a-2 can include a second Authority Key Identifier or an identity for the certificate issuer public key used to verify the second certificate issuer certificate 201a-2, where the second Authority Key Identifier can comprise the identify for the certificate issuer root public key of ID-Cert1-Root.CI 203-2. The values or identities for the certificate issuer public keys of ID-Cert1-Root.CI 203-1 and ID-Cert1-Root.CI 203-2 can be used with an Authority Information Access value in order for the recipient of a certificate issuer certificate to lookup or query for the corresponding certificate issuer root public keys in root certificates 301a-1 and 301a-2.

In exemplary embodiments, the certificate issuer certificates 201a-1 and 201a-2 can include an Authority Information Access value 301 comprising a uniform resource indicator (URI) or uniform resource locator (URL) for a file or files which contain (i) the certificate issuer root certificate of Cert1-Root.CI 301a-1 and the corresponding certificate issuer root public key PK1-Root.CI 302-1 and (ii) the certificate issuer root certificate of Cert2-Root.CI 301a-2 and the corresponding certificate issuer root public key PK2-Root.CI 302-2. In exemplary embodiments, the data or files referenced by an Authority Information Access value 301 (or files or data) can be sent by a server 101 along with the certificate issuer certificates 201a-1 and 201a-2. In exemplary embodiments, the data or files referenced by an Authority Information Access value 202 associated with server certificates 102-1 and 102-2 can be sent by a server 101 along with the Authority Information Access value 301 (or files or data). An exemplary Authority Information Access value 301 is depicted in FIG. 3 as a file or URL of "URL=https://CI.net/Root-Certs/"Root-Certs".p7c", which could be a file equivalent to the Authority Information Access value 202 above, but with root certificate data for the certificate issuer.

The Authority Information Access value 301 (or file or data associated with the value) can comprise at least two certificate issuer root certificates of Cert1-Root.CI 301a-1 and Cert1-Root.CI 301a-2. A first certificate issuer root certificate Cert1-Root.CI 301a-1 can include a first digital signature algorithm 103-1 and a first root public key PK1-Root.CI 302-1 and first parameters Parameters1.PK.CI 106-1. A second certificate issuer root certificate Cert2-Root.CI 301a-2 can include a second digital signature algorithm 103a-2 and a second root public key PK2-Root.CI 302-2 and second parameters Parameters2.PK.CI 106-2. In exemplary embodiments, the first digital signature algorithm and first parameters can be associated with a classical digital signature algorithm such as RSA or ECC based algorithms, and the second digital signature algorithm and second parameters can be associated with a post-quantum cryptography algorithm such as lattice based. Other possibilities and combinations are possible as well without departing from the scope of the present invention. The exemplary certificate issuer root certificates can comprise self-signed certificates, where a root private key for the root public key is used to generate the self-signed certificates. The root certificates can be verified with the root public key in the root certificates and the specified digital signature algorithm and parameters.

FIG. 4a

FIG. 4a is a simplified message flow diagram illustrating an exemplary system with exemplary steps and exemplary data sent and received by a device, a server, and a certificate issuer, in accordance with exemplary embodiments. A system 400 can include a device 430, a server 101, and a certificate issuer 104. The device 430, server 101, and certificate issuer 104 can communicate via an internet protocol (IP) network 401. IP network 401 could be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 401 could utilize globally routable IP addresses, and a private IP network 401 could utilize private IP addresses which could also be referred to as an Intranet. Other possibilities for IP Network 401 exist as well without departing from the scope of the invention.

Device 430 could utilize a wireless network such as Wi-Fi, 4G LTE, or 5G wireless technologies in order to access IP network 401. Server 101 and certificate issuer 104 could use wired or fiber optic technologies to access IP network 401, such as using a network interface 201k within server computing hardware 201, as well as equivalent electrical components for server computing hardware 201. In exemplary embodiments, certificate issuer 104 can include server computing hardware 201 in order to conduct the steps and transmit and receive the messages depicted in FIG. 4a. Device 430 can include device computing hardware 701, where device computing hardware 701 is depicted and described in connection with FIG. 7 below.

In exemplary embodiments, device 430 can use electrical components for device computing hardware 701 that are smaller capacities than computing hardware 201 for server 101, such as less RAM memory 201f and a smaller processor 201p. Additional details regarding the components for the operation of a device 430 are depicted and described in connection with FIG. 7 below, including device computing hardware 701. Device 430 could comprise a smartphone, a laptop computer, a computing device, a smart camera, an intelligent sensor for the "internet of things", a tracking device, health monitoring equipment in a hospital, a desktop computer, and other possibilities exist as well without departing from the scope of the present disclosure. In exemplary embodiments, device 430 operates a client program or executable instructions by a processor in device 430 for communicating with server 101. A sever 101 in FIG. 4a can comprise a server 101 as depicted and described in FIG. 2. A certificate issuer 104 can comprise the entity associated with the identity with a certificate issuer identity 104i as depicted and described in FIG. 1.

At step 401, a certificate issuer 104 can select a first digital signature algorithm 103-1 and a second digital signature algorithm 103-2. Exemplary digital signature algorithms 103 were depicted and described in connection with FIG. 1 and FIG. 2 above. In exemplary embodiments, a first digital signature algorithm 103-1 can comprise a classical digital signature algorithm such as based on RSA or ECC algorithms. In exemplary embodiments, the second digital signature algorithm 103-2 can comprise a digital signature algorithm supporting post-quantum cryptography, such as based on lattice, code, multivariate, or hash algorithms. Or, the first digital signature algorithm 103-1 can support post-quantum cryptography and the second digital signature algorithm 103-2 can support classical digital signature algorithms. Parameters 106-1 and 106-2 can also be selected by the certificate issuer 104 for the first digital signature algorithm 103-1 and the second digital signature algorithm 103-2 in a step 401.

At step 402, the certificate issuer 104 can generate a first root certificate Cert1-Root.CI 301a-1 with a first root public key PK1-Root.CI 302-1 for the first digital signature algorithm 103-1. At step 402, the certificate issuer 104 can generate a second root certificate Cert2-Root.CI 301a-2 with a second root public key PK2-Root.CI 302-2 for the second digital signature algorithm 103-2.

At step 403 firmware and software can be stored or recorded in device 430 during or after manufacturing. The firmware and software can be stored within nonvolatile memory or storage memory 201h within device computing hardware within device 430, where device computing hardware for device 430 are depicted and described in connection with FIG. 7 below. The firmware and software can include device drivers for computing hardware within device 430. Nonvolatile memory for device 430 may be a NAND flash memory and record firmware for device 430. Nonvolatile memory can record long-term and non-volatile storage of data or files for device 430. In an exemplary embodiment, an operating system with configuration settings is recorded in device nonvolatile memory in a step 403. The operating system can include digital signature algorithms and cryptographic algorithms 201s used by device 430 in subsequent steps in FIG. 4a and additional Figures below. The operating system can include client software or firmware for device 430 to conduct the subsequent steps depicted herein, such as generating a Transport Layer Security (TLS) "client hello" message, receiving and processing a TLS "server hello" messages, etc. Device nonvolatile memory may also be referred to as "device storage" and can include exemplary file systems of FAT16, FAT 32, NTFS, ext3, ext4, UDF, or similar file systems.

Upon power up of device 430 after a step 403, portions of device nonvolatile memory are moved by the device processor into device RAM memory when device 430 powers on. Device RANI memory (such as RAM 701*f* depicted in FIG. 7 below) (i) can be integrated with a device processor (such as CPU 701*p* in depicted in FIG. 7 below) into a single integrated circuit (potentially as a "system on a chip"), or (ii) operate as a separate integrated circuit or a removable card or device.

In a message 403*a*, a device 430 can receive the certificate issuer root certificates comprising Cert1-Root.CI 301*a*-1 and Cert2-Root.CI 301*a*-2. In exemplary embodiments, device 430 may not receive the root certificates from a certificate issuer directly, but via a third party such as a device owner or system integrator or another party responsible for configuring device 430. In some embodiments, the certificate issuer root certificates can be included with the operating systems loaded in a step 403 for device 430.

A server 101 can conduct a step 404 equivalent to a step 403 for device 430 above, where server 101 is loaded is an operating system and configuration settings or parameters. The operating system can include the steps for generating digital signatures and also sending and receiving data with device 430. A step 404 could include server 101 loading and operating a server package for processing TLS messages such as OpenSSL or BouncyCastle, and other possibilities exist as well. In exemplary embodiments, server 101 conducting the steps in FIG. 4*a* can comprise a virtual server operating on a host server, where the host server includes computing hardware 201.

At step 405, server 101 can select at least a first digital signature algorithm 103-1 and a second digital signature algorithm 103-2. Parameters 106-1 and 106-2 can for the digital signature algorithms 103-1 and 103-2 can be selected concurrently at a step 405. Or, instructions from a step 404 could program server 101 to select and use the two digital signature algorithms and associated parameters. Server 101 can generate a first private key and corresponding first public key for the first digital signature algorithm 103-1, where the first public key can comprise PK1.Server 105-1. Server 101 can generate a second private key and corresponding second public key for the second digital signature algorithm 103-2, where the second public key can comprise PK2.Server 105-2. As depicted and described in connection with FIG. 7 below, server 101 can use a hardware random number generator (depicted as "128" in FIG. 7) in order to generate both the first private key and the second private key.

Although not depicted in FIG. 4*a*, server 101 and certificate issuer 104 could establish a secure channel over IP network 401 to support subsequent communications such as message 405*a*. Server 101 can send certificate issuer 104 a message 405*a*, where the message 405*a* includes the an identity or name for the first digital signature algorithm 103-1, the first server public key PK1.Server 105-1, an identity or name for the second digital signature algorithm 103-2, and the second server public key PK2.Server 105-2. Although a single message 405*a* is depicted in FIG. 4*a*, a message 405*a* and other messages herein can comprise multiple parts or segments, such that a first portion of the message is transmitted in a first part of the message and a second portion of the message or data is transmitted in a second part of the message or data.

Figure 4B:
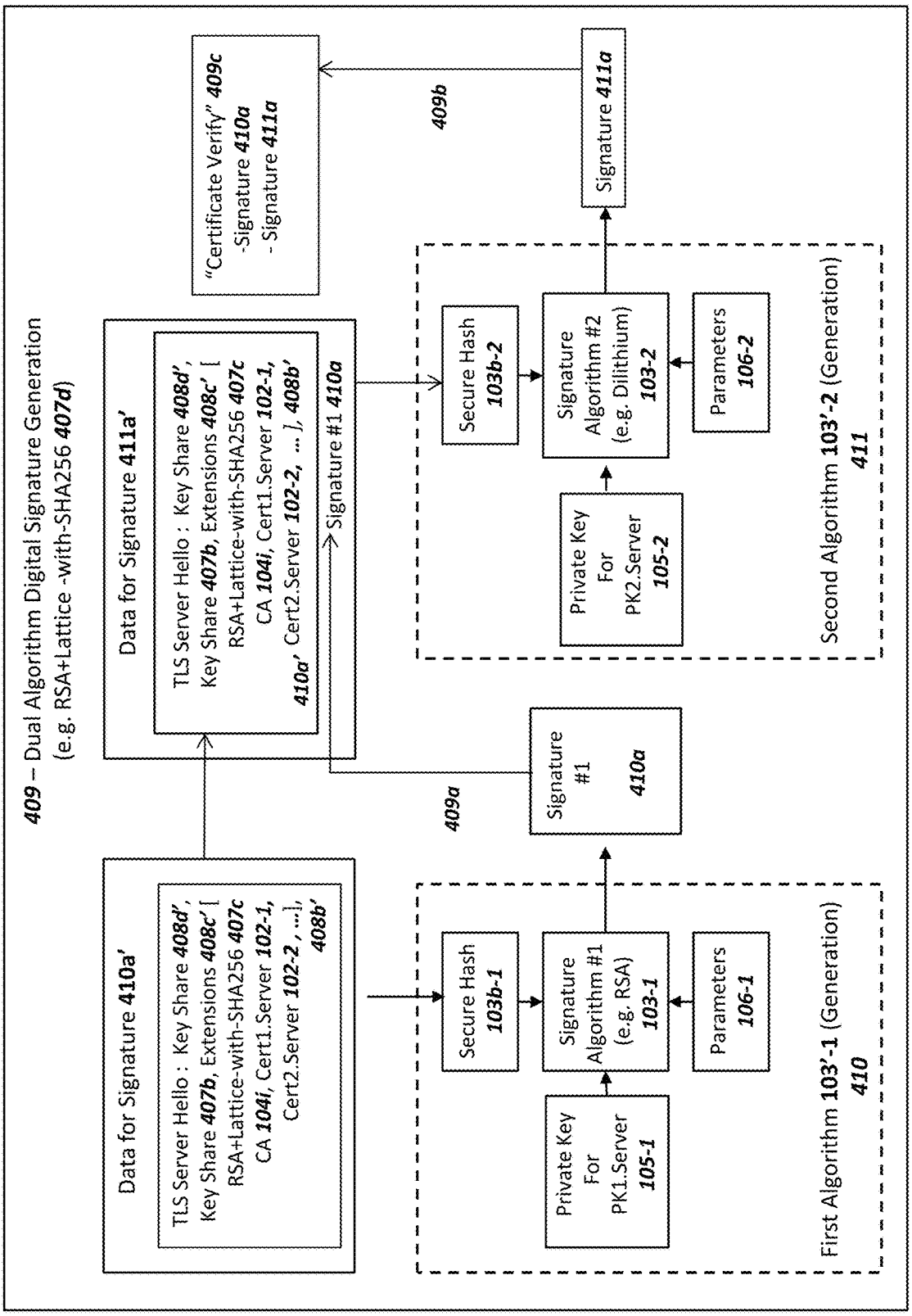
FIG. 4b is a flow chart illustrating exemplary steps for dual algorithm digital signature generation using PKI keys, parameters, and data input, in accordance with exemplary embodiments.

Certificate issuer 104 can conduct a first digital signature generation step 103'-1 using the first digital signature algorithm 103-1 and the first public key PK1.Server 105-1 in order to generate the first server certificate Cert1.Server 102-1. Step 103'-1 can use a first certificate issuer private key associated with the first root certificate generated in a step 402 above. The operation of a first digital signature generation step 103'-1 is also depicted in FIG. 4*b* below for a server to create a first digital signature, but the step 103'-1 in FIG. 4*a* can be also be used by certificate issuer 104 for the generation of the first server certificate (where the message to sign 410*a'* in a step 103'-1 by CI 104 comprises data for the first server certificate 102-1).

Certificate issuer 104 can conduct a second digital signature generation step 103'-2 using the second digital signature algorithm 103-2 and the second public key PK1.Server 105-2 in order to generate the second server certificate Cert2.Server 102-2. Step 103'-2 can use a second certificate issuer private key associated with the second root certificate generated in a step 402 above. The operation of a second digital signature generation step 103'-2 is also depicted in FIG. 4*b* below, but the step 103'-2 in FIG. 4*a* is can be for generation of the second server certificate. Certificate issuer 104 can also select and provide first intermediate certificates 202 for verification of the first server certificate Cert1.Server 102-1, where the first intermediate certificates 202 can use the first digital signature algorithm. Certificate issuer 104 can also select and provide second intermediate certificates 301 for verification of the second server certificate Cert2.Server 102-2, where second intermediate certificates 301 can use the second digital signature algorithm.

In message 405*c*, server 101 can receive the first and second server certificates Cert1.Server 102-1 and Cert2.Server 102-2 from certificate issuer 104. Message 405*c* can also include (i) first intermediate certificates 201 for verification of the first server certificate Cert1.Server 102-1 using the first digital signature algorithm 103-1 and also (ii) second intermediate certificates 301 for verification of the second server certificate Cert2.Server 102-2 using the second digital signature algorithm 103-2. At step 406, server 101 can store the received server certificates in nonvolatile memory such as storage memory 201*h* depicted and described in connection with FIG. 2 above.

At step 406, server 101 can also load the certificates with a server process for conducting transport layer security such as TLS, where the server process could comprise software or computer executable instructions such as OpenSSL, Microsoft Server, etc. In addition, although TLS is described as a technology or protocol for a secure session, other and related protocols could be used as well for processing digital signatures in the current disclosure, including IP Security (IPSec), Datagram Transport Layer Security (DTLS) with UDP messages, Secure Shell (SSH), and other possibilities exist as well.

At step 406, server application software for conducting a secure session with device 430 such as a TLS server could be configured to support the use of dual digital signature algorithms 409, which is depicted and described in connection with FIG. 4*b* below. The dual digital signature algorithms 409 could comprise the use of a first digital signature algorithm 103-1 and a second digital signature algorithm 103-2. The use of a combined first digital signature algorithm 103-1 and a second digital signature algorithm 103-2 could be specified by a value 407*c* or extensions 407*c* which specifies the use of both the first digital signature algorithm 103-1 and the second digital signature algorithm 103-2 in the generation of a "CertificateVerify" message or equivalently a digital signature generated by the server 101.

At step 407, device 430 can process or generate a "Client Hello" message 407a using the computing hardware 701 (in FIG. 7 below) for device 430 as well as the operating system and stored parameters within device 430 recorded in a step 403 above. Device 430 can generate an ephemeral PKI key pair comprising a device ephemeral public key and a device ephemeral private key. The algorithm used to generate the ephemeral PKI key pair can be specified in parameters within Extensions 407c for the "Client Hello" message. The device ephemeral PKI key pair can comprise a key pair supporting an Elliptic Curve Diffie Hellman (ECDH) key exchange, or other key exchange mechanisms and algorithms such as the public key exchange/key exchange algorithms (KEM) specified in Round 2 of the NIST "Post Quantum Cryptography" (PQC) project. The device ephemeral public key generated in a step 407 can comprise the value of Key Share 407b within a "Client Hello" message 407a. Device 430 can also generate a random number for inclusion in the "Client Hello" message 407a in a step 407.

Continuing at a step 407, device 430 can generate Extensions 407c for the "Client Hello" message 407a. Extensions 407c can include data or values for device 430 and server 101 to establish a secure session between the two nodes. Although three different exemplary values or fields within Extensions 407c are depicted in FIG. 4a, the Extensions 407c can include a plurality of values or fields in addition to those depicted in FIG. 4a. Extensions 407c can include an identity for a certificate issuer or certificate authority of Identity.CI 104i. The identity for the certificate issuer of Identity.CI 104i can comprise a name or string recorded in a certificate issuer certificate such as a root certificate 301a-1 or 301a-2, or possibly an intermediate certificate issuer certificate 201a-1 or 201a-2. The identity for the certificate issuer of Identity.CI 104i can comprise the "certificate authorities" extension as specified in IETF RFC 8846, although in some embodiments the value for the identity for the certificate issuer of Identity.CI 104i can be omitted.

Continuing at a step 407, device 430 can include names or values for the digital signature algorithms 103 supported by device 430 in Extensions 407c, which could comprise at least a first digital signature algorithm 103-1 and a second digital signature algorithm 103-2. A first digital signature algorithm in Extensions 407c could support classical cryptography such as based on RSA or ECC algorithms, and a second digital signature algorithm in Extensions 407c can support post-quantum cryptography (PQC) algorithms. FIG. 4a depicts the first digital signature algorithm 103-1 in Extensions 407c as supporting RSA algorithms, but other possibilities exist as well without departing from the scope of the present disclosure. FIG. 4b depicts the second digital algorithm 103-2 in Extensions 407c as supporting Lattice algorithms (such as Dilithium), but other possibilities exist as well without departing from the scope of the present disclosure.

Extensions 407c from a step 407 can also optionally include the specification or value for the identity of a dual digital signature algorithm 407d, which can select the use of both the first digital signature algorithm 103-1 and the second digital signature algorithm 103-2 for the generation of a "CertificateVerify" digital signature 409c by server 101. In other words, the identity of the dual digital signature algorithm 407d can identify or specify the combined use of the first digital signature algorithm 103-1 and the second digital signature algorithm 103-2 in a subsequent step 409 conducted by server 101 (and verified by device 430 in a step 420 below), where step 409 is described below and also depicted and described in connection with FIG. 4b below. The exemplary value for the identity of the dual digital signature algorithm 407d is depicted in FIG. 4a as "RSA+ Lattice", although other possibilities exist as well without departing from the scope of the present disclosure. A third value or field within Extensions 407c processed by device 430 in a step 407 can include a certificate request 407e, such that the "Client Hello" message 407a can request certificates and at least one digital signature from server 101 that supports other fields or values in Extensions 407c such as the digital signature algorithms 103-1, 103-2, and 407c, as well as the identity of the certificate issuer 104i. In exemplary embodiments, the certificate request 407e can request the server provide at least a first server certificate 102-1 for the first digital signature algorithm 103-1 and a second server certificate 102-2 for the second digital signature algorithm 103-2. In exemplary embodiments, the certificate request 407e for support and use of two different server certificates can signal that the server 101 should generate a digital signature for each of the two different server certificates.

After the conclusion of a step 407 by device 430 to process a "Client Hello" message 407a, the device 430 can send the "Client Hello" message 407a to the server 101 via IP network 401. The computing hardware within device 430 could conduct the steps for transferring data for the message 407a from a RAM memory in device 430 to a network interface within device 430 using a data bus, and the network interface could transmit the message 407a to the IP network 401. A domain name for server 101 or an IP address for server 101 could be stored in device 430 before a step 407, such as, but not limited to, a step 403. Server 101 can receive the "Client Hello" message 407a via a network interface 201k in computing hardware 201 (depicted for server 101 in FIG. 2 and also in FIG. 7 below). The network interface 201k for server 101 could receive the message 407a from the IP network 401. The computing hardware within server 101 could conduct the steps for transferring data for the message 407a from a network interface 201k in server 101 to a RAM 201f within server 101 using a data bus for system bus 201n. Server 101 can use application software such as, but not limited to, OpenSSL with cryptographic algorithms 201s and computing hardware 201 to process the received "Client Hello" message 407a.

At step 408a, server 101 can conduct a first step to process the "Client Hello" message 407a. Server 101 can confirm the "Client Hello" message 407a is supported by server 101 using the values within Extensions 407c. In exemplary embodiments the extensions 407 could specify the use of both (i) a first digital signature algorithm 103-1 and a first server certificate Cert1.Server 102-1 and (ii) a second digital signature algorithm 103-2 and a second server certificate Cert2.Server 102-2. Server 101 can validate that the key share 407b (e.g. device ephemeral public key) received is properly structured and consistent with values in Extensions 407c such as supporting cryptographic algorithms specified by Extensions 407c. Note that the device key share 407b can support either classical cryptography such as an ECDH key exchange or a post-quantum cryptography key exchange mechanism. For some exemplary embodiments, the device key share 407b can support both classical cryptography such as an ECDH key exchange or a post-quantum cryptography key exchange mechanism, such that two different device ephemeral public keys are included within a device key share 407b.

Device key share 407b that supports post-quantum cryptography can comprise a public key that is used for a key encapsulation mechanism (KEM), where server 101 uses the public key with asymmetric encryption to encrypt a message for a symmetric ciphering key into a ciphertext. Device 430 can use the private key corresponding to the public key in the device key share 407b in order to decrypt the asymmetric ciphertext 408b' of the message for the symmetric ciphering key into a shared secret 408b'' (described below XX N.) for use with a mutually shared (between server 101 and device 430) symmetric ciphering key. The use of device key share 407b for selecting and conducting a KEM could be specified by parameters within Extensions 407c.

Continuing at step 408a, server 101 can select a first server certificate Cert1.Server 102-1 and a second server certificate Cert2.Server 102-2 supporting received Extensions 407c. For example, (i) the selected first server certificate Cert1.Server 102-1 can support both a name for the first digital signature algorithm 103-1 in Extensions 407c and an identity of a certificate issuer 104i and, (ii) the selected second server certificate Cert2. Server 102-2 can support both a name for the second digital signature algorithm 103-2 in Extensions 407c and the identity of a certificate issuer 104i. For some embodiments, the identity of certificate issuer 104i in Extensions 407c could be omitted and server 101 could select the server certificates 102-1 and 102-2 based on the digital signature algorithms 103-1 and 103-2, respectively, in Extensions 407c.

At step 408b, server 101 can conduct a key encapsulation mechanism (KEM) with both the device ephemeral public key for device key share 407b. For embodiments that use a post-quantum cryptography KEM for exchanging a shared secret 408b'', then ciphertext 408b' could comprise an asymmetrically encrypted ciphertext to derived a shared secret 408b'', which can be generated in a step 408b. A random number generated by server 101 could (i) be used to generate a shared secret 408b'' for device 430 and server 101, and (ii) be encrypted using the received device ephemeral public key as device key share 407b using the key encapsulation mechanism (KEM) for the device ephemeral public key and parameters within message 407a. The random number could be generated using a hardware random number generator 128 for server 101 as depicted and described in connection with FIG. 7 below. For exemplary embodiments, the value of asymmetric ciphertext 408b' could comprise a ciphertext for the shared secret 408b'' from a step 408b. For these embodiments, the value of asymmetric ciphertext 408b' could comprise the exemplary value of "c" from FIG. 1 of the paper entitled "CRYSTALS—Kyber: a CCA-secure module-lattice-based KEM" in FIG. 1 of section 5 labeled "Key Exchange Protocols", where server 101 operates as P2 in FIG. 1. Other possibilities and KEM algorithms exist as well without departing from the scope of the present disclosure, including the use of different post-quantum cryptography key exchange mechanisms.

For a second, different embodiment that used ECDH key exchanges, at step 408b, server 101 can conduct a key exchange the device ephemeral public key for key share 407b. Server 101 at step 408b can also generate an ephemeral PKI key pair comprising a server ephemeral public key and a server ephemeral private key in a step 408b compatible with both (i) the device ephemeral public key in device key share 407b and (ii) parameters for the device key share 407b in Extensions 407c. For this embodiment using ECDH, the generated server ephemeral public key can comprise a server key share 408d'. For embodiments supporting an ECDH key exchange, in a step 408b can conduct an ECDH key exchange with device ephemeral public key from device key share 407b received in message 407a and a server ephemeral private key derived in a step 408b in order to mutually derive shared secret 408b'' and then derive a symmetric ciphering key and an associated MAC key. A step 408b can follow the steps and procedures as specified by section 7 of RFC 8446 for the shared secret 408b'' and then deriving the symmetric ciphering key, although other possibilities exist as well for the derivation of a shared secret key 408b'' and a symmetric ciphering key without departing from the scope of the present invention. In summary, at step 408b, server 101 can generate a shared secret 408b'' for encryption of data in a "Server Hello" message 413a. For embodiments that use ECDH, then a server key share 408d' would be external to ciphertext within a message 413a below. For embodiments that do not use ECDH, then a server key share 408d' would be within a symmetrically encrypted ciphertext, where the symmetrically encrypted ciphertext would be encrypted using the shared secret 408b'' from a KEM with the device ephemeral public key from the device key share 407b.

At step 408c, server 101 can select server Extensions 408c' used by the server in generating a subsequent "Server Hello" message. Server 101 can use both (i) the received device Extensions 407c from a "Client Hello" message 407a and (ii) stored parameters and algorithms from a step 404 in order to generate server Extensions 408c. Server Extensions 408c' can select subsets of algorithms or parameters offered or proposed by device 430 in the "Client Hello" message 407c. For embodiments of the present invention, the server Extensions 408c' selected by a server 101 in a step 408c can include both the first digital signature algorithm 103-1 and the second digital signature algorithm 103-2 received in device Extensions 407c. Server Extensions 408c' can also include or specify the identity of a dual algorithm digital signature 407d, which can specify the combined use of both the first digital signature algorithm 103-1 and the second digital signature algorithm 103-2, as described for a step 409 below and also depicted and described for a step 409 in FIG. 4b below. The server Extensions 408c' selected in a step 408c can include a first server certificate 102-1 and a second server certificate 102-2 from a step 403a above. At step 408d, for embodiments where the use of a post-quantum cryptography key exchange mechanism (KEM) is specified within extensions 407c received from device 430 in a message 407a, then server 101 could generate a server key share 408d'. Server 101 can include a PQC key pair generation algorithm from cryptographic algorithms 201s and parameters from extensions 407c. A PQC key pair generation algorithm to generate (i) a random number from a random number generator in order to derive a device ephemeral PKI private key and (ii) a corresponding server ephemeral PKI public key, which can comprise the server key share 408d'.

The server public key for server key share 408d' can comprise a first private key for an exemplary lattice-based algorithm of Kyber768. In other words, the extensions 407c could specify use of Kyber768. The KEM parameters from extensions 407c could specify values of the device ephemeral public key for server key share 408d' of n=256 and q=7681. The KEM parameters that define keys and ciphertext could be set to du=11, dv=3 and dt=11. For Kyber768, the values of k could be 3 and n could be 4. Other values for KEM parameters are possible as well without departing from the scope of the present disclosure, such as an exemplary lattice-based algorithm of Kyber1024. With Kyber 1024, the values associated KEM parameters could be the same as above, except for the use of k=4 and n=5.

In an exemplary embodiments that use Kyber algorithms, the server PKI key generation function used in a step 408*d* can comprise "Algorithm 1 Kyber:CPA:KeyGen( ): key generation" from the paper "CRYSTALS—Kyber: a CCA-secure module-lattice-based KEM" (referred to herein as the Kyber paper), which is herein incorporated by reference. Other PQC key generation functions from Round 2 of the NIST PQC project could be used for a PQC.KeyGen 101*q* function as well, without departing from the scope of the present disclosure. The derived server key share 408*d'* comprising a server public key can be (i) included in a subsequent message 413*a* below for device 430, (ii) included in a first "message to sign" 410*a'* and second "message to sign" 411*a'*, and (iii) subsequently used by device 430 to conduct a second KEM using the server key share 408*d'*.

At step 409, server 101 can select algorithms and conduct a dual algorithm digital signature generation. The algorithms for digital signature generation could be specified or identified by the dual signature algorithm identifier 407*d* received in Extensions 407*c*. In other words, the dual signature algorithm identifier 407*d* can specify the use of two digital signature algorithms (e.g. algorithms 103-1 and 103-2) for a step 409. The selected algorithms for digital signature generation could be also be specified by both a first digital signature algorithm 103-1 and a second digital signature algorithm 103-2 received in Extensions 407*c* from the "Client Hello" message 407*a*. A step 409 for conducting a dual algorithm digital signature generation is also depicted and described in connection with FIG. 4*b* below. In summary, the step 409 can include both a first step 410 to generate a first digital signature 410*a* using the first digital signature algorithm 103-1 and a second step 411 to generate a second digital signature 411*a* using the second digital signature algorithm 103-2. For a step 409 server 101 can process and select data to include in a first message to sign 410*a'*, where the first message to sign 410*a'* for the first digital signature algorithm 103-1 can include portions of a "Server Hello" message (without the digital signature 410*a* or "CertificateVerify" segment itself). In other words, the first message to sign 410*a'* for a step 410 within a step 409 can include portions of the "Server Hello" message.

For a step 409, server 101 can process and select data to include in a second message to sign 411*a'*, where the second message to sign 411' for the second digital signature algorithm 103-2 can include both (i) a "Server Hello" message (optionally without the "CertificateVerify" segment itself) and (ii) the first digital signature 410*a*. The use and operation of a step 409 by server 101 is depicted and described in connection with FIG. 4*b* below. In other words, the second message to sign 411*a'* for a step 411 within a step 409 can include portions of the "Server Hello" message that include the first digital signature 410*a* using the first digital signature algorithm 103-1. The second message to sign 411*a'* or second "data for signature" 411*a'* are depicted and described in connection with FIG. 4*b* below.

Note that the inclusion of the first digital signature 410*a* in the second message to sign 411*a'* increases security of a system 400, since the second digital signature 411*a* can be over both (i) the first message to sign 410*a'* and (ii) the first digital signature 410*a*. In other words, instead of creating two separate digital signatures for the same input data of a first message to sign 410*a'*, the second digital signature 411*a* can also be over at least the first digital signature 410*a*. The second message to sign 411*a'* can include the first digital signature 410*a* and the first message to sign 410*a'*. The output of a step 409 can comprise a digital signature for a "CertificateVerify" 409*c*, where the "CertificateVerify" 409*c* can include both the first digital signature 410*a* from a step 410 and the second digital signature 411*a* from a step 411. Or, for some embodiments the digital signature for a "CertificateVerify" 409*c* value can comprise the second digital signature 411*a*.

At step 412, server 101 can encrypt data for a "Server Hello" message 413*a* using the shared secret 408*b''*, where the shared secret 408*b''* was exchanged or derived using a step 408*b* above. The encrypted data for a "Server Hello" message 413*a* can also include "message authentication code" (MAC) values using a MAC key derived using the shared secret 408*b''*. The algorithms and steps for a step 412 could be specified in Extensions 407*c*, such as specifying the use of the Advanced Encryption Standard (AES) with a ciphertext chaining mode such as Electronic Code Book mode (ECB), Cipher Block Chaining mode (CBC), etc. Other symmetric ciphering algorithms and parameters can be used as well in a step 412. Note that a shared secret 408*b''* from a step 408*b* can be used to mutually derive both a symmetric ciphering key and a MAC key for both the server 101 and device 430. A step 412 can include the input of plaintext and an output of ciphertext 412*a* using a symmetric ciphering algorithm. The selected plaintext for input can include (i) extensions 408*c'*, (ii) the CertificateVerify 409*c* from a step 409, and (iii) a server key share 408*d'* of a server public key from a step 408*d*. Note that the CertificateVerify 409*c* can include both the first digital signature 410*a* from a step 410 and the second digital signature 411*a* from a step 411. In exemplary embodiments, the server key share value 408*d'* can be omitted from the plaintext used in a step 412 to generate a ciphertext 412*a* using the shared secret 408*b'*. In these embodiments, the server key share 408*d'* could be sent as plaintext in a subsequent message 413*a*.

At step 413, server 101 can generate, assemble, or compose the response second message 413*a*, wherein the response message 413*a* includes at least (i) the first server certificate 102-1, (ii) the second server certificate 102-2, (iii) the first message to sign 410*a'*, (iv) the first digital signature 410*a*, (v) the second digital signature 411*a*, and a server key share 408*d'*. In a step 413, the response second message 413*a* can also include the selected server extensions 408*c'* and a server key share 408*d'*. A step 413 could also include the asymmetric ciphertext 408*b'* within a response second message 413*a*. A step 413 can comprise the processor 201*p* reading each of the values (i) through (v) in the first sentence of this paragraph and 408*c'* and 408*b'* from different locations in RAM memory 201*f*, and creating a new memory address for the combined values of (i) through (v) and 408*c'* and 408*b'* for the response second message 413*a*.

At step 413, server 101 can complete the processing of a "Server Hello" message 413*a*. Server 101 could include the server key share value 408*b'* with the ciphertext 412*a*. Server 101 could select IP addresses and port numbers to transmit the "Server Hello" message 413*a* to device 430, where the same IP addresses and port numbers were used to receive the "Client Hello" message 407*a*. Server 101 could transmit or send the "Server Hello" message 413*a* to device 430 through IP network 401. "Server Hello" message 413*a* could comprise [TLS Server Hello:, asymmetric ciphertext 408*b'*, {Key Share 408*d'*, Extensions 408*c'*, the identity of a first digital signature algorithm 103-1 (e.g. "RSA"), the identity of a second digital signature algorithm 103-2 (e.g. "Lattice", the identity of a dual algorithm digital signature 407*c* (e.g. "RSA+Lattice"), a certificate issuer identity such as Identity.CI 104*i*, a first server certificate Cert1.Server 102-1, and a second server certificate of Cert2.Server 102-2, the Certificate Verify digital signature 409c (which comprises the first digital signature 410a and second digital signature 411a)}].

In other words, at step 413, server 101 can generate, assemble, or compose the response message 413a, wherein the response message 413a includes at least (i) the first server certificate 102-1, (ii) the second server certificate 102-2, (iii) the first message to sign 410a', (iv) the first digital signature 410a, (v) the second digital signature 411a, (vi) an asymmetric ciphertext 408b' for a KEM with the device key share 407b, and (vii) a server key share 408d' of a server public key. For embodiments where the second "message to sign" or "data for signature" 411a' (depicted and described in connection with FIG. 4b below) includes the first digital signature 410a, then a step 413 could also include data of the first "message to sign" or "data for signature" 410a' (also depicted and described in connection with FIG. 4b below).

For a "Server Hello" message 413a, the use of "[ ]" two paragraphs above and also in FIG. 4a indicates the data input into the generation of "CertificateVerify" 409c value or digital signatures 410a and 411a. The use of "{ }" indicates data that is encrypted and has message authentication as a ciphertext 412a symmetrically encrypted using the shared secret key 408b". The shared secret key of (408b") indicates the shared secret key is used to generate the ciphertext 412a, but the shared secret key is not included as in the "Server Hello" message 413a. In addition, although the symmetrically encrypted values for key share 408d', extensions 408c', etc. are depicted in FIG. 4a as within the data input into the generation of "CertificateVerify" 409c (e.g. depicted within the brackets "[ ]"), in preferred embodiments the plaintext values instead of symmetrically encrypted values are used to generate and verify the "CertificateVerify" 409c.

For embodiments where a post-quantum cryptography key exchange mechanism is utilized, then information for generating the shared secret key of 408b" could be included as asymmetric ciphertext 408b', which is described as an embodiment for a step 408b above. In exemplary embodiments, the "Server Hello" message 413a can also include the device key share 407b which was received by server 101 in the message 407a. Or, in related exemplary embodiments the "Server Hello" message 413a could include a secure hash value over the device key share 407b instead of the full device key share 407b (since PQC algorithms may have relatively long public keys).

Device 430 can receive the "Server Hello" message 413a and conduct steps to process the message and data. In a step 414, device 430 can process the "Server Hello" message 413a, such as separating the "Server Hello" message 413a into different segments or fields and storing the data from "Server Hello" message 413a in RAM memory 701f of device 430 (depicted in FIG. 7 below). Additional details for a step 414 are depicted and described for a step 414 below in FIG. 6. In a step 414, device 430 can validate that received asymmetric ciphertext 408b' is compatible and valid according to the parameters for a key exchange specified in Extensions 407c. Note that "Server Hello" message 413a can include a selected cipher suite external to ciphertext 412a, such as within a header field, in order for device 430 to know and select the correct cipher suite to process ciphertext 412a.

In a first embodiment for a step 415, device 430 could conduct a post-quantum cryptography key exchange mechanism with (i) the device ephemeral private key generated in a step 407 and (ii) the received asymmetric ciphertext 408b'. The device could decrypt ciphertext received as asymmetric ciphertext 408b' using the device ephemeral private key in order to read a plaintext shared secret 408b". For this embodiment, the value of server asymmetric ciphertext 408b' could comprise the exemplary value of "c" from FIG. 1 of the paper entitled "CRYSTALS—Kyber: a CCA-secure module-lattice-based KEM" in FIG. 1 of section 5 labeled "Key Exchange Protocols", where device 430 operates as P1 in FIG. 1. Device 430 can covert the received ciphertext of "c" into the plaintext shared secret 408b". Other possibilities and KEM algorithms exist as well without departing from the scope of the present disclosure, including the use of different post-quantum cryptography key exchange mechanisms.

In a second embodiment for a step 415, device 430 could conduct an ECDH key exchange with (i) the device ephemeral private key generated in a step 407 and (ii) a received server ephemeral public key as server key share 408d'. For these embodiments, then an asymmetric ciphertext 408b' could be omitted from a message 413a and the server key share 408d' of the server public key would be external to the symmetric ciphertext 412a. The resulting key exchange can be a point on a curve specified by parameters within Extensions 407c and the X-coordinate of the point could be used as a shared secret 408b". The use of an ECDH key exchange is described in "IEEE Standard Specifications for Public Key Cryptography", IEEE Std. 1363-2000.

In a step 416, device 430 can decrypt and authenticate ciphertext 412a using the shared secret 408b" from a step 415. Step 416 can use the selected cipher suite from a step 414 with the shared secret 408b" to decrypt the values within "()" depicted for message 413a in FIG. 4a. In a step 416, device 430 can derive both a symmetric ciphering key and a MAC key using a hash key derivation function (HKDF) such as those specified in section 7 of IETF RFC 8446. The symmetric ciphering key can be used for decryption with symmetric ciphering algorithms such as AES, and the MAC key can be used to check message integrity and MAC codes. Upon conclusion of a step 416, device 430 can read plaintext values from ciphertext 412a, where ciphertext 412a is included in the received message 413a. Device 430 could also read the decrypted server key share 408d' of a server public key in order conduct a subsequent KEM step to generate a second shared secret key with server 101.

At step 417, device 430 can read and process the first server certificate 102-1 and the second server certificate 102-2 from the plaintext in "Server Hello" message 413a. Device 430 can verify the dates and other fields are valid and supported. The first server certificate 102-1 can support a first digital signature algorithm 103-1 for verification of the first server certificate, and the second server certificate 102-2 can support a second digital signature algorithm 103-2 for verification of the second server certificate. The first server certificate 102-1 can specify a first certificate issuer certificate 201a-1 in a first authority key identifier 107-1 and the second server certificate 102-2 can specify a second certificate issuer certificate 201a-2 in a second authority key identifier 107-2. Both the first and second certificate issuer certificates 201a-1 and 201a-2 can use a certificate issuer identity 104i. Step 417 can comprise device 430 reading, fetching, or downloading both the first certificate issuer certificate 201a-1 and the second certificate issuer certificate 201a-2.

At step 418, device 430 can verify both the first certificate issuer certificate 201a-1 and the second certificate issuer certificate 201a-2. Note the first certificate issuer certificate 201a-1 can use the first digital signature algorithm 103-1 and the second certificate issuer certificate 201a-2 and use the second digital signature algorithm 103-2. The first certificate issuer certificate 201a-1 can specify a first parent certificate or a first root certificate of 301a-1. The second certificate issuer certificate 201a-2 can specify a second parent certificate or a second root certificate of 301a-2. Device 430 can read, fetch, or download the parent certificates and verify the parent certificates up through root certificates. Note that the root certificates of the first root certificate of 301a-1 and second root certificate of 301a-2 could be securely stored in device 430 before receipt of "Server Hello" message 413a, such as from a message 403a or a step 403 above in FIG. 4a.

In a step 419, device 430 can verify all parent or intermediate certificates for the first certificate issuer certificate 201a-1 and the second certificate issuer certificate 201a-2 up through the securely stored first root certificate of 301a-1 and second root certificate of 301a-2. A first certificate chain for the first certificate issuer certificate 201a-1 can use the first digital signature algorithm 103-1 and the second certificate chain for the second certificate issuer certificate 201a-2 can use the second digital signature algorithm 103-2. A step 419 can also include device 430 verifying values and signatures for Online Certificate Status Protocol (OCSP) values received in a message 413a, in order to confirm that parent and intermediate certificates remain valid. OSCP values are not depicted in a message 413a in FIG. 4a, but the OSCP values could be included in a message 413a.

At step 420, device 430 can select algorithms and conduct dual algorithm digital signature verification. The algorithms for digital signature verification could be specified or identified by the dual signature algorithm identifier 407d sent in Extensions 407c. In other words, the dual signature algorithm identifier 407d can specify the use of two digital signature algorithms (e.g. algorithms 103-1 and 103-2) for a step 420. The selected algorithms for digital signature verification could be also be specified by both a first digital signature algorithm 103-1 and a second digital signature algorithm 103-2 sent in Extensions 407c from the "Client Hello" message 407a. A step 420 for conducting a dual algorithm digital signature verification is also depicted and described in connection with FIG. 4c below.

In summary, the step 420 can include both a first step 421 to verify a first digital signature 410a using the first digital signature algorithm 103-1 and a second step 422 to verify a second digital signature 411a using the second digital signature algorithm 103-2. A step 420 by device 430 is also depicted and described in connection with FIG. 4c below. The first digital signature 410a and the second digital signature 411a can be included in a "Certificate Verify" 409c from a message 413a. For a step 420 device 430 can process and select data to include in a first message to verify 410a', where the message to verify 410a' for the first digital signature algorithm 103-1 can include portions of the "Server Hello" message (optionally without the digital signature 410a or "CertificateVerify" segment itself). Note that the first message to verify 410a' can be equal to the first message to sign 410a' used by server 101. In other words, the first message to verify 410a' for a step 421 within a step 420 can include portions of the "Server Hello" message.

For a step 422, device 430 can process and select data to include in a second message to verify 411a', where the second message to verify 411a' for the second digital signature algorithm 103-2 can include both (i) portions of a "Server Hello" message (optionally without the "CertificateVerify" segment itself) and (ii) the first digital signature 410a. Note that the second message to verify 411a' can be equal to the message to sign 411a' used by server 101. In other words, the second message to verify 411a' for a step 422 within a step 420 can include portions of the "Server Hello" message that include the first digital signature 410a using the first digital signature algorithm 103-1. Note that the inclusion of the first digital signature 410a in the second message to verify 411a' increases security of a system 400, since the second digital signature 411a can be over both (i) the first message to sign 410a' and (ii) the first digital signature 410a. In other words, instead of creating two separate digital signatures for the same input data of the first message to sign 410a', the second message to sign 411a' can include the first digital signature 410a.

The output of a step 420 can comprise a digital signature 411a-1 which can be compared with the received digital signature 411a. Upon conclusion of a step 420, the successful comparison of a calculated digital signature 411a-1 by device 430 with received digital signature 411a from server 101 in a "Certificate Verify" 409c can confirm that server 101 is authenticated and can be trusted. The received "CertificateVerify" 409c, can include both the server first digital signature 410a and the second server digital signature 411a. For some embodiments, a "CertificateVerify" 409c could include only the second server digital signature 411a and the first server digital signature 410a could be external to the "CertificateVerify" 409c value but received in the message 413a.

After verification of a "CertificateVerify" 409c and server digital signatures 410a and 411a, device 430 can conduct a step 423 to derive a TLS mater secret as described in section 7.1 of RFC 8446. In exemplary embodiments, a TLS master secret (or equivalently a master secret for protocols other than TLS), can be derived with a hash key derivation function (HKDF) over data communicated between device 430 and server 101 that includes at least both the first digital signature 410a and the second digital signature 411a. One benefit of including at least both the first digital signature 410a and the second digital signature 411a for input into a HKDF to derive a master secret is that information entropy used to generate the master secret can be increased and other benefits are available as well.

Other possibilities exist as well for deriving a TLS master secret in a step 423 without departing from the scope of the present disclosure. Data input into the derivation of a TLS master secret for device 430 can comprise (i) the shared secret 408b" derived or received in a step 415 and (ii) the plaintext values for data transmitted in message 407a and 413a. In a step 424, device 430 can encrypt application data using the TLS master secret from a step 423. The TLS master secret can be used for both encryption and message authentication, such as deriving a symmetric ciphering key and a MAC key using the TLS master secret using the HKDF. The encrypted application data from a step 424 can comprise a ciphertext 424a. Device 430 can send server 101 a "Client Finished" message 425 with the application data as ciphertext 424a.

FIG. 4b

FIG. 4b is a flow chart illustrating exemplary steps for dual algorithm digital signature generation using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 4b can comprise the steps and data used by a server 101 in a step 409 in order to generate a "CertificateVerify" 409c portion of a "Server Hello" message 413a sent from server 101 to device 430 as depicted and described in connection with FIG. 4a above. The digital signature algorithms used for the dual algorithm digital signature generation can be specified in an identity 407d of the dual algorithm digital signature generation, which could comprise a first digital signature algorithm 103-1 and a second digital signature algorithm 103-2. The identity 407d could be received by server 101 in Extensions 407c within a "Client Hello" message 407a. The identity 407d or parameters 106 could specify which digital signature algorithm 103 is used for the first digital signature algorithm 103-1 and which digital signature algorithm 103 is used for the second digital signature algorithm 103-2 in a step 409.

In FIG. 4b, a signature generation step 409 can comprise a step using the sub-steps of (i) obtaining a first message to sign 410a', (ii) a sub step 410 to generate a first digital signature 410a using a first digital signature algorithm 103'-1 (where 103'-1 is the generation portion of digital signature algorithm 103-1), (iii) including the first digital signature 410a in a second message to sign 411a', where the second message to sign 411a can also include the first message to sign 410', and (iv) a sub step 411 to generate a second digital signature 411a using a second digital signature algorithm 103'-2 (where 103'-2 is the generation portion of digital signature algorithm 103-2), and then (v) creating a "CertificateVerify" 409c value with both the first digital signature 410a and the second digital signature 411a. For some embodiments, the "CertificateVerify" 409c can comprise the second digital signature 411a, and the first digital signature 410a could be sent in a "Server Hello" message 413a outside of the "CertificateVerify" 409c value or portion of the "Server Hello" message 413a.

The step 409 can include both a first step 410 to generate a first digital signature 410a using the first digital signature algorithm 103-1 and a second step 411 to generate a second digital signature 411a using the second digital signature algorithm 103-2. For a step 409 server 101 can process and select data to include in a first message to sign 410a', where the first message to sign 410a' for the first digital signature algorithm 103-1 can include portions of a "Server Hello" message (optionally without the digital signature 410a or "CertificateVerify" segment itself). In other words, the first message to sign 410a' for a step 410 within a step 409 can include portions of the "Server Hello" message. Note the first message to sign 410a' is depicted in FIG. 4b as "Data for Signature 410a". The protocol for the secure session can specify the specific structure, sequence, and data to include within both the first message to verify 410a' for the device and the first message to sign 410a' used by the server.

The depicted portions of the "Server Hello" message 413a for a first message to sign 410a' can include server asymmetric ciphertext 408b' from a step 408b, the device key share 407b, the server key share 408d' and Extensions 408c', where Extensions 408c' can include the identity 407d of the dual algorithm digital signature generation (e.g. depicted as "RSA+Lattice-with-SHA256 407c"), the certificate issuer identity of 104i, the first server certificate of Cert1.Server 102-1, and the second server certificate of Cert2.Server 102-2. Additional data could be included in the first message to sign 410a' as depicted by " . . . '. For example, a common name for the first digital signature algorithm 103-1 and the second digital signature algorithm 103-2 could also be in the first message to sign 410a' and possibly within Extensions 408c'. The specification of a cipher suite selected and used by server 101 for the generation of ciphertext 412a could also be within the first message to sign 410a'. Although not depicted in FIG. 4b, the first message to sign 410a' as well as the second message to sign 411a' can include a random number generated by the device 430 and received by the server 101 in the message 407a.

In general, the protocol for server 101 and device 430 can specify mutually agreed values for the first message to sign 410a' such that the server 101 and device 430 are inputting the same values into the digital signature algorithm used by each node. Note that in some exemplary embodiments, the second server certificate of Cert2.Server 102-2 could be omitted from the first message to sign 410a'. In some exemplary embodiments, the first server certificate of Cert1.Server 102-1 could be omitted from the message to sign 410a'. In exemplary embodiments, the first message to sign 410a' as well as the second message to sign 411a' can also include the device key share 407b. In this manner, security of the system 400 depicted in FIG. 4a can be increased, since a "man in the middle" attacker could attempt to substitute the device key share 407b with a fraudulent device key share.

By server 101 generating the digital signatures 410a and 411a over at least the device key share 407b (and device 430 subsequently successfully verifying the digital signatures 410a and 411a), then device 430 can authenticate that server 101 generated a shared secret 408b" using the device key share 407b and not a fraudulent device key share. In other words, the digital signatures 410a and 411a over the device key share 407b can increase security for embodiments where the device key share 407b comprises a device ephemeral public key for a key encapsulation mechanism (KEM) supporting post-quantum cryptography.

In FIG. 4b, signature creation step 410 can comprise a step using the sub-steps of obtaining the first message to sign 410a', calculating a first secure hash value 103b-1 with a specified secure hash algorithm, using a first private key for the first server public key PK1.Server 105-1 in the first server certificate 102-1, using the first signature algorithm 103-1, inputting first parameters 106-1, and calculating a resulting first digital signature 410a. Signature creation step 410 could comprise an RSA-based digital signature algorithm (DSA) or an ECC based elliptic curve digital signature algorithm (ECDSA), and other possibilities exist as well for a first signature algorithm 410 and signature verification algorithm 421 in FIG. 4c below without departing from the scope of the present disclosure. For some embodiments the signature creation step 410 could use a post-quantum cryptography digital signature algorithm instead of the classical digital signature algorithm depicted in FIG. 4b.

When using a DSA or ECDSA algorithm in non-deterministic mode for a signature creation 410, a value of "k" or "r", which could comprise a random number, can be associated with the digital signature 410a. When using a DSA or ECDSA in deterministic mode, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with digital signature 410a (such as value "k" or "r") can be optionally omitted, such that "r" can be deterministically calculated based on the first message to sign 410a'. In exemplary embodiments, device 430 and servers 101 can utilize deterministic ECDSA without also sending a random number along with a digital signature, although the value "r" from the deterministic mode could be sent with the digital signature 410a. In other words, a value can be sent with the digital signature 410a that is deterministically derived and associated with the message to sign. In other exemplary embodiments, a random number can be generated a derived value for the random number such as "r" sent with digital signature 410a.

For a signature creation 410 step, the exemplary first message to sign comprises data 410a' described in FIG. 4b above. The first message to sign 410a' values can be transmitted to the verifying party, such as from server 101 to device 430 shown for message 413a in FIG. 4a. The message to sign values can be input into a message digest algorithm or secure hash algorithm 103b-1, which could comprise a standard algorithm such as SHA-256, SHA-3, or similar algorithms. The output of message digest algorithm 103b-1 can be input along with first parameters 106-1 and the first private key for server public key PK1.Server 105-1 into first signature algorithm 103-1. First parameters 106-1 can specify encoding rules, padding, key lengths, selected algorithms, curve names (for ECC algorithms), a modulus (for RSA algorithms) and other values or fields necessary to utilize a signature algorithm 103-1. Both a signature creation step 410 and a signature verification step 421 in FIG. 4c below can use the same or equivalent values for parameters 106-1. Although not depicted in FIG. 4b, a random number for values such as "k" and "r" for ECDSA and related signatures could be input as well into a signature algorithm 410.

The output of the first signature algorithm 103-1 in a step 410 can be a digital signature 410a, which can be both (i) transmitted to device 430 for verification within a response second message 413a and also (ii) input into a second message to sign 411a' for use with the second signature creation step 411. For some exemplary embodiments, a secure hash value of the first digital signature 410a can be included within the second message to sign 411a' instead of the full or complete first digital signature 410a. Note that the use of a first digital signature algorithm 103'-1 for signature generation (e.g. the signature generation portion of a digital signature algorithm 103-1) in a step 410 can be different from conventional technology in several ways. First, the resulting first digital signature 410a from a step 410 can be over at least the second server certificate 102-2 (and in some exemplary embodiments as depicted in FIG. 4b also the first server certificate 102-1). The second server certificate 102-2 can specify the use of a second digital signature algorithm 103-2 for the server public key PK2.Server 105-2 that is different than the first digital signature algorithm 103-1 used to generate the first digital signature 410a over at least the second server certificate 102-2. With conventional technology, a digital signature created over a server digital certificate such as a server certificate 102' depicted in FIG. 1 would be generated using the digital signature algorithm 103a specified for the server public key 105 in the server certificate 102', as depicted and described in connection with FIG. 1.

In addition, the second server certificate 102-2 included in the "message to sign" 410a' can specify the use of second parameters 106-2 for (i) the server public key PK2.Server 105-2 that is different than the first digital signature algorithm 103-1 and the first parameters 106-1 used to generate the first digital signature 410a over at least the second server certificate 102-2. With conventional technology, a digital signature created over a server digital certificate such as a server certificate 102' depicted in FIG. 1 would be generated using parameters 106 specified for the server public key 105 in the server certificate 102', as depicted and described in connection with FIG. 1. In other words, the first digital signature 410a can be generated with first parameters 106-1 that are different than the second parameters 106-2 for a server certificate (e.g. second server certificate 102-2) that is included in the "message to sign" 410a'.

In a step 409, server 101 can conduct a step 409a to read the output of step 410 and the first digital signature 410a and include the first digital signature 410a in the second message to sign 411a'. In some exemplary embodiments, the second message to sign 411a' comprises the first message to sign 410a' (described in FIG. 4b above) with the addition of the first digital signature 410a in the second message to sign 411a'. Although the first digital signature 410a is depicted in FIG. 4b as appended to the end of the first message to sign 410a' in the second message to sign 411a', the first digital signature 410a could be included in other locations or sequences in the second message to sign 411a'. The protocol for a secure session between server 101 and device 430 could specify the sequence or location of including the first digital signature 410a and the first message to sign 410a' within the second message to sign 411a'.

In other exemplary embodiments, the second message to sign 411a' comprises the first digital signature 410a, and the first server certificate 102-1 and/or the second server certificate 102-2 could be omitted from the second message to sign 411a'. For all embodiments of the present invention the first message to sign 410a' used or selected by server 101 in FIG. 4b can be equal to or the same as the first message to verify 410a' used or selected by device 430 in FIG. 4c below. For all embodiments of the present invention, the second message to sign 411a' used or selected by the server 101 in FIG. 4b can be equal to or the same as the second message to verify 411a' used or selected by device 430 in FIG. 4c below.

In a step 409, signature creation step 411 can comprise a step using the sub-steps of obtaining the second message to sign 411a', calculating a second secure hash value 103b-2 with a specified secure hash algorithm, using a second private key for the second server public key PK2.Server 105-2 in the second server certificate 102-2, using a second signature algorithm 103-2, inputting second parameters 106-2, and calculating a resulting second signature 411a. Signature creation step 411 could comprise a second digital signature algorithm 103-2 supporting post-quantum cryptography, such as the exemplary digital signature algorithms listed and described in "Post-Quantum Cryptography Standardization" from Wikipedia dated Mar. 12, 2019, which is herein incorporated by reference. Example digital signature algorithms for a signature creation step 411 include (i) CRYSTALS-DILITHIUM, FALCON, and qTESLA using Lattice-based algorithms, (ii) SPHINCS+ using hash-based algorithms, and (iii) GeMSS, LUOV, MQDSS, and Rainbow using multivariate based algorithms.

Other possibilities exist as well for digital signature algorithms supporting post-quantum cryptography (PQC) for a signature creation step 411 without departing from the scope of the present disclosure. In addition, although a step 409 in FIG. 4b (and equivalently for a step 420 in FIG. 4c below) depicts the first digital signature algorithm 103-1 as supporting a classical algorithm and the second digital signature algorithm 103-2 as supporting a PQC algorithm, for some embodiments the first digital signature algorithm 103-1 could support a PQC algorithm and the second digital signature algorithm could support a classical algorithm.

For a signature creation 411 step, the exemplary second message to sign comprises data 411a' described in FIG. 4b above. Note that the message to sign 410a' can be referred to as a first message to sign and the message to sign 411a' can be referred to as a second message to sign. Data for the second message to sign 411a' values can be transmitted to the verifying party, such as from server 101 to device 430 shown for message 413a in FIG. 4a. The message to sign values can be input into a message digest algorithm or secure hash algorithm 103b-2, which could comprise a standard algorithm such as SHA-256, SHA-3, or similar algorithms. The output of message digest algorithm 103b-2 can be input along with second parameters 106-2 and the second private key for the second server public key PK2.Server 105-2 into the second signature algorithm 103-2. Second parameters 106-2 can specify encoding rules, padding, key lengths, selected algorithms, and other values or fields necessary to utilize the second signature algorithm 103-2. Both a signature creation step 411 and a signature verification step 422 in FIG. 4c below can use the same or equivalent values for second parameters 106-2.

Note that the use of a second digital signature algorithm 103'-2 for signature generation (e.g. the signature generation portion of a second digital signature algorithm 103-2) in a step 411 can be different from conventional technology in several ways. First, the resulting second digital signature 411a from a step 411 can be over at least the first server certificate 102-1 (and in some exemplary embodiments as depicted in FIG. 4b also the second server certificate 102-2). The first server certificate 102-1 can specify the use of a first digital signature algorithm 103-1 for the server public key PK1.Server 105-1 that is different than the second digital signature algorithm 103-2 used to generate the second digital signature 411a over at least the first server certificate 102-1. With conventional technology, a digital signature created over a server digital certificate such as a server certificate 102' depicted in FIG. 1 would be generated using the digital signature algorithm 103a specified for the server public key 105 in the server certificate 102', as depicted and described in connection with FIG. 1.

In addition, the first server certificate 102-1 included in the "message to sign" 411a' can specify (i) the use of first parameters 106-1 for the server public key PK1.Server 105-1 that is different than (ii) the second digital signature algorithm 103-2 and the second parameters 106-2 used to generate the second digital signature 411a over at least the first server certificate 102-1. With conventional technology, a digital signature created over a server digital certificate such as a server certificate 102' depicted in FIG. 1 would be generated using parameters 106 specified for the server public key 105 in the server certificate 102', as depicted and described in connection with FIG. 1. In other words, the second digital signature 411a can be generated with second parameters 106-2 that are different than the first parameters 106-1 for a server certificate (e.g. first server certificate 102-1) that is included in the "message to sign" 411a'.

The output of signature creation step 411 can comprise second digital signature 411a. For a step 409b, server 101 can include the second digital signature 411a in a value for "CertificateVerify" 409c. For some embodiments, the "CertificateVerify" 409c can include both the first digital signature 410a and the second digital signature 411a (depicted in FIG. 4b). For other embodiments, the "CertificateVerify" 409c can comprise the second digital signature 411a and the first digital signature 410a can be sent from the server 101 to the device 430 outside of or separate from the value or field for a "CertificateVerify" 409c.

FIG. 4c

Figure 4C:
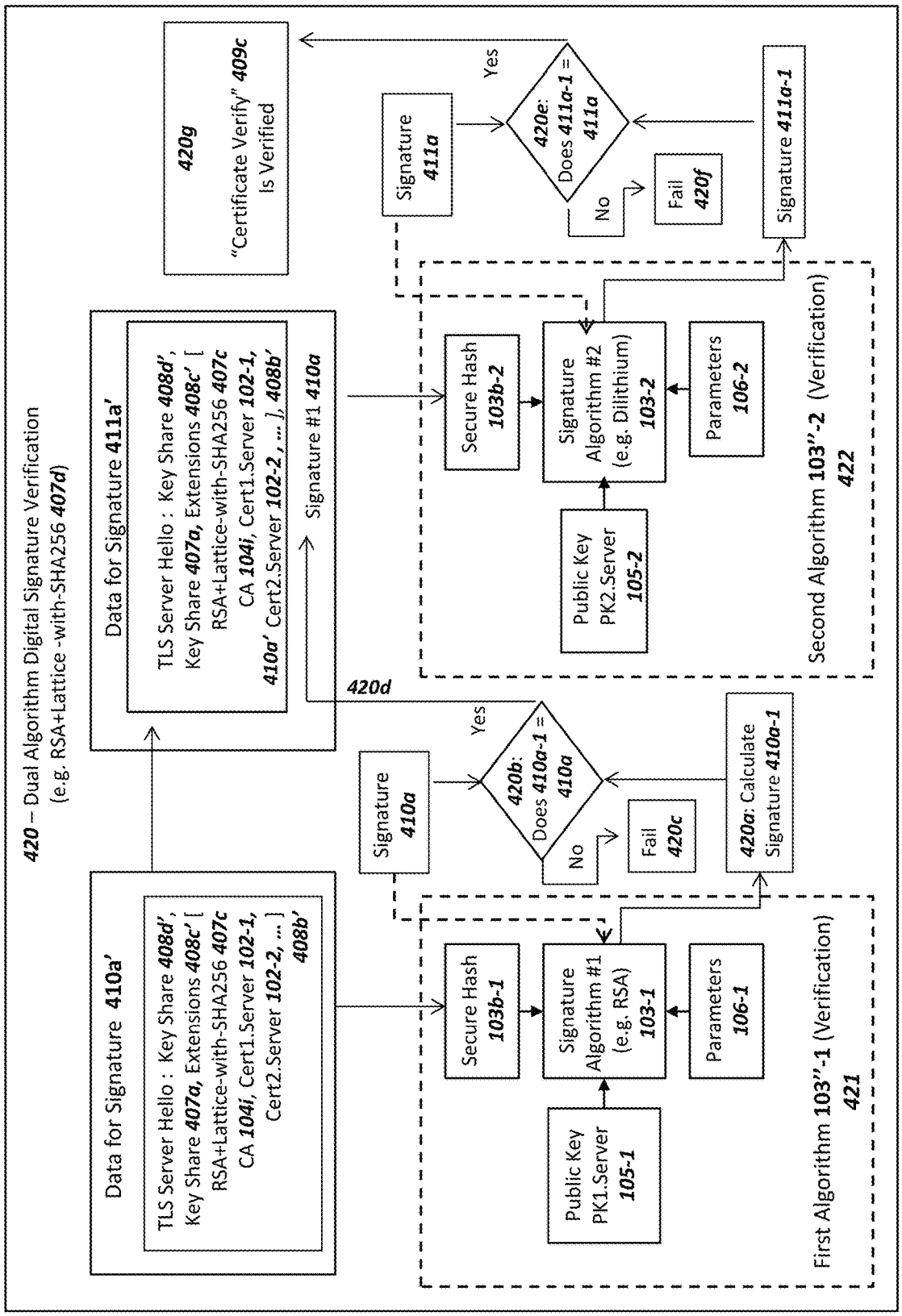
FIG. 4c is a flow chart illustrating exemplary steps for dual algorithm digital signature verification using PKI keys, parameters, and data input, in accordance with exemplary embodiments.

FIG. 4c is a flow chart illustrating exemplary steps for dual algorithm digital signature verification using PKI keys, parameters, and data input, in accordance with exemplary embodiments. FIG. 4c can comprise the steps and data used by a device 430 in a step 420 in order to verify a "CertificateVerify" 409c portion of a "Server Hello" message 413a received from server 101 by device 430 as depicted and described in connection with FIG. 4a above. The digital signature algorithms used for the dual algorithm digital signature verification can be specified in an identity 407d of the dual algorithm digital signature generation, which could comprise a first digital signature algorithm 103-1 and a second digital signature algorithm 103-2. The identity 407d could be received from server 101 in Extensions 408c' within a "Server Hello" message 413a. The identity 407d or parameters 106 could specify which digital signature algorithm 103 is used for the first digital signature algorithm 103-1 and which digital signature algorithm 103 is used for the second digital signature algorithm 103-2 in a step 420.

In FIG. 4c, a signature verification step 420 can comprise a step using the sub-steps of (i) obtaining a first message to verify 410a' (depicted as "Data for Signature 410a'), (ii) a sub step 421 to verify a first digital signature 410a using a first digital signature algorithm 103"-1 (where 103"-1 is the verification portion of digital signature algorithm 103-1), (iii) including the first digital signature 410a in a second message to verify 411a' (depicted as "Data for Signature 411a'), where the second message to verify 411a can also include the first message to verify 410', and (iv) a sub-step 422 to calculate a second digital signature 411a-1 using a second digital signature algorithm 103"-2 (where 103"-2 is the verification portion of digital signature algorithm 103-2), and then (v) comparing a calculated second digital signature 411a-1 from sub-step 422 with the received second digital signature 411a in order to authenticate server 101. In exemplary embodiments the received second digital signature 411a can be included in a field or value within the response second message 413a of a "CertificateVerify" 409c, as depicted and described in connection with FIG. 4a and FIG. 4b above.

The step 420 can include both a first step 421 to verify a first digital signature 410a from the response second message 413a using the first digital signature algorithm 103-1 and a second step 411 to verify a second digital signature 411a using the second digital signature algorithm 103-2. For a step 420 device 430 can process and select data to include in a first message to verify 410a', where the message to verify 410' for the first digital signature algorithm 103-1 can include at least portions of a "Server Hello" message 413a received by device 430 (optionally without the digital signature 410a or "CertificateVerify" segment itself). In exemplary embodiments, data for the first message to verify 410a' can be the exact same data used by server 101 for a first message to sign 410a'. In other words, the first message to verify 410a' by device 430 can be same as the first message to sign 410a' depicted and described for a server 101 above in FIG. 4b. The protocol for the secure session can specify the specific structure, sequence, and data to include within both the first message to verify 410a' for the device and the first message to sign 410a' used by the server. The data selected by device 430 for the data in a message to verify 410a' are depicted and described above in connection with FIG. 4b and also depicted in FIG. 4c with the same values.

In exemplary embodiments, and depicted and described in connection with a first data for signature 410a' in FIG. 4b above, the first data for signature 410a' can also include the device key share 407b, which can comprise a device ephemeral public key for a key encapsulation mechanism (KEM). Consequently the verification subsequent verification steps 421 and 422 can also be over the device key share 407b, which can increase security of a system 400 depicted in FIG. 4a above and prevent a "man in the middle" between device 430 and server 101 from successfully substituting a fraudulent device key share. Similarly, the first data for signature 410a' can include the server key share 408d', such that device 430 can use the dual signature verification step 420 to verify that server 101 generated or is associated with the server key share 408d' in an authenticated manner.

In FIG. 4c, signature verification step 421 can comprise a step using the sub-steps of obtaining the first message to verify 410a', calculating a first secure hash value 103b-1 with a specified secure hash algorithm, using the first server public key PK1.Server 105-1, using the first signature algorithm 103-1, inputting first parameters 106-1, and calculating a resulting first digital signature 410a-1. Signature verification step 420 could comprise an RSA-based digital signature algorithm (DSA) or an ECC based elliptic curve digital signature algorithm (ECDSA), and other possibilities exist as well for a first signature verification algorithm 421 and the equivalent first signature generation algorithm 410 in FIG. 4b above without departing from the scope of the present disclosure. Although not depicted in FIG. 4c, for some embodiments, the verification of a digital signature can also include the input of a portion of the digital signature such as a portion of digital signature 410a into the first digital signature algorithm 103-1.

For a signature verification 421 step, the exemplary first message to verify comprises data 410a' described in FIG. 4c and FIG. 4b above. The first message to verify 410a' values can be received from the signing party, such as from server 101 to device 430 shown for message 413a in FIG. 4a. The first message to verify values 410a' can be input into a message digest algorithm or secure hash algorithm 103b-1, which could comprise a standard algorithm such as SHA-256, SHA-3, or similar algorithms. The output of message digest algorithm 103b-1 can be input along with first parameters 106-1 and the first server public key PK1.Server 105-1 into first signature algorithm 103-1. First parameters 106-1 can specify encoding rules, padding, key lengths, selected algorithms, curve names (for ECC algorithms), a modulus (for RSA algorithms) and other values or fields necessary to utilize a signature algorithm 103-1. Both a signature creation step 410 above and a signature verification step 421 in FIG. 4c can use the same or equivalent values for parameters 106-1. Although not depicted in FIG. 4c, a random number for values such as "k" and "r" for ECDSA and related signatures could be input as well into a signature algorithm 421. The output of the first signature algorithm 103-1 in a step 421 for a step 420a can be a calculated first digital signature 410a-1.

Note that the use of a first digital signature algorithm 103"-1 for signature verification (e.g. the signature verification portion of a digital signature algorithm 103-1) in a step 421 can be different from conventional technology in several ways. First, the resulting calculated first digital signature 410a from a step 421 can be over at least the second server certificate 102-2 (and in some exemplary embodiments as depicted in FIG. 4c also the first server certificate 102-1). The second server certificate 102-2 can specify the use of a second digital signature algorithm 103-2 for the server public key PK2.Server 105-2 that is different than the first digital signature algorithm 103-1 used to verify the first digital signature 410a over at least the second server certificate 102-2. With conventional technology, a digital signature verified by a device over a server digital certificate such as a server certificate 102' depicted in FIG. 1 would be verified using the digital signature algorithm 103a specified for the server public key 105 in the server certificate 102', as depicted and described in connection with FIG. 1.

In addition, the second server certificate 102-2 included in the "message to sign" 410a' can specify the use of second parameters 106-2 for the server public key PK2.Server 105-2 that is different than the first digital signature algorithm 103-1 and the first parameters 106-1 used to verify the first digital signature 410a over at least the second server certificate 102-2. With conventional technology, a digital signature verified over a server digital certificate such as a server certificate 102' depicted in FIG. 1 would be verified using parameters 106 specified for the server public key 105 in the server certificate 102', as depicted and described in connection with FIG. 1. In other words, the first digital signature 410a can be verified with first parameters 106-1 that are different than the second parameters 106-2 for a server certificate (e.g. second server certificate 102-2) that is included in the "message to verify" 410a'.

For a step 420b, the received first digital signature 410a and the calculated first digital signature 410a-1 from a step 421 can be compared. If the received first digital signature 410a and the calculated first digital signature 410a-1 from a step 421 are equal, then the received first digital signature 410a can be considered verified. Device 430 can trust that server 101 stores and uses a private key corresponding to the public key in the first server certificate 102-1. If the received first digital signature 410a and the calculated first digital signature 410a-1 from a step 421 are not equal, then the signature verification fails and device 430 can transmit an error message to server 101. After determining the received first digital signature 410a and the calculated first digital signature 410a-1 from a step 421 are equal, the device 430 can conduct a step 420d to include the first digital signature in a second message to verify 411a'

In exemplary embodiments, the second message to verify 411a' comprises (i) the first message to verify 410a' (described in FIG. 4c above and also FIG. 4b) with the addition of (ii) the first digital signature 410a in the second message to verify 411a'. Although the first digital signature 410a is depicted in FIG. 4a as appended to the end of the first message to verify 410a' in the second message to verify 411a', the first digital signature 410a could be included in other locations or sequences in the second message to verify 411a'. The protocol for a secure session between server 101 and device 430 could specify the sequence or location of including the first digital signature 410a and the first message to verify 410a' within the second message to verify 411a'. In exemplary embodiments, the second message to sign 411a' for server 101 in FIG. 4b above can be exactly the same as the second message to verify 411a' by device 430. Consequently, the values and data depicted and described in connection with the second message to sign 411a' in FIG. 4b above apply to the second message to verify 411a' by device 430 in a step 420.

In a step 422, signature verification can comprise a step using the sub-steps of obtaining the second message to verify 411a', calculating a second secure hash value 103b-2 with a specified secure hash algorithm, using a second server public key PK2.Server 105-2, using a second signature algorithm 103-2 (depicted as a second signature algorithm 103"-2 for the verification portion), inputting second parameters 106-2, and calculating a resulting second signature 411a-1. Signature verification step 422 could comprise a second digital signature algorithm 103-2 supporting postquantum cryptography, such as the exemplary digital signature algorithms listed and described in "Post-Quantum Cryptography Standardization" (PQC) from Wikipedia dated Mar. 12, 2019, which is herein incorporated by reference. Example digital signature algorithms for a signature verification step 422 were described above for the equivalent signature generation step 411 in FIG. 4b above. In addition, although a step 420 in FIG. 4c depicts the first digital signature algorithm 103-1 as supporting a classical algorithm and the second digital signature algorithm 103-2 as supporting a PQC algorithm, for some embodiments the first digital signature algorithm 103-1 could support a PQC algorithm and the second digital signature algorithm 103-2 could support a classical algorithm.

For a signature verification 422 step, the exemplary message to verify comprises data 411a' described in FIG. 4c above and also 4b above. Note that the message to verify 410a' can be referred to as a first message to verify and the message to verify 411a' can be referred to as a second message to verify. Data for the message to verify 410a' values in message to verify 411a' can be received from server 101 by device 430 shown for message 413a in FIG. 4a. The protocol for the secure session can specify the specific structure, sequence, and data to include within both the second message to verify 411a' for the device and the second message to sign 411a' used by the server. Subsets of data used and sequence of data within both (i) the first message to sign 410a' and the first message to verify 410a' and (ii) the second message to sign 411a' and the second message to verify 411a' can change without departing from the scope of the present disclosure.

The second message to verify 411a' values can be input into a message digest algorithm or secure hash algorithm 103b-2, which could comprise a standard algorithm such as SHA-256, SHA-3, or similar algorithms. The output of message digest algorithm 103b-2 can be input along with second parameters 106-2 and the second server public key PK2.Server 105-2 into the second signature algorithm 103-2. Second parameters 106-2 can specify encoding rules, padding, key lengths, selected algorithms, and other values or fields necessary to utilize the second signature algorithm 103-2. Both a signature creation step 411 in FIG. 4b and a signature verification step 422 in FIG. 4c can use the same or equivalent values for second parameters 106-2. The output of signature creation step 422 can comprise a calculated second digital signature 411a-1. Although not depicted in FIG. 4c, for some embodiments, the verification of a received second digital signature 411a can also include the input of a portion of the digital signature such as a portion of digital signature 411a into the second digital signature algorithm 103-2.

Note that the use of a second digital signature algorithm 103'-2 for signature verification (e.g. the signature generation portion of a second digital signature algorithm 103-1) in a step 422 can be different from conventional technology in several ways. First, the resulting calculated second digital signature 411a-1 from a step 422 can be over at least the first server certificate 102-1 (and in some exemplary embodiments as depicted in FIG. 4b also the second server certificate 102-2). The first server certificate 102-1 can specify the use of a first digital signature algorithm 103-1 for the server public key PK1.Server 105-1 that is different than the second digital signature algorithm 103-2 used to verify the received second digital signature 411a over at least the first server certificate 102-1. With conventional technology, a digital signature verified over a server digital certificate such as a server certificate 102' depicted in FIG. 1 would be verified using the digital signature algorithm 103a specified for the server public key 105 in the server certificate 102', as depicted and described in connection with FIG. 1.

In addition, the first server certificate 102-1 included in the "message to verify" 411a' can specify (i) the use of first parameters 106-1 for the server public key PK1.Server 105-1 that is different than (ii) the second digital signature algorithm 103-2 and the second parameters 106-2 used to verify the second digital signature 411a over at least the first server certificate 102-1. With conventional technology, a digital signature verified over a server digital certificate such as a server certificate 102' depicted in FIG. 1 would be verified using parameters 106 specified for the server public key 105 in the server certificate 102', as depicted and described in connection with FIG. 1. In other words, the second digital signature 411a can be verified with second parameters 106-2 that are different than the first parameters 106-1 for a server certificate (e.g. first server certificate 102-1) that is included in the "message to verify" 411a'.

For a step 420e, the received second digital signature 411a and the calculated second digital signature 411a-1 from a step 422 can be compared. If the received second digital signature 411a and the calculated second digital signature 411a-1 from a step 422 are equal, then the received second digital signature 411a can be considered verified. Device 430 can trust that server 101 stores and uses a private key corresponding to the public key in the second server certificate 102-2. If the received second digital signature 411a and the calculated second digital signature 411a-1 from a step 422 are not equal, then the signature verification fails and device 430 can transmit an error message to server 101. After determining the received second digital signature 411a and the calculated second digital signature 411a-1 from a step 422 are equal, the device 430 can conduct a step 420g determine and store data that the "CertificateVerify" 409c within "Server Hello" message 413a is verified and continue the secure session such as encrypting application data and sending a "Client Finished" message 425 as depicted and described in connection with FIG. 4a above.

Note that the inclusion of the first digital signature 410a in the second message to verify 411a' increases security for a system 400 depicted in FIG. 4a, since the complexity or information entropy used to generate and verify a second digital signature 411a is increased. The alternative of simply generating and verifying a single value for "Data for Signature" 410a' by a first digital signature algorithm and then the same "Data for Signature" 410a' by a second digital signature algorithm (where the first digital signature 410a is not used with the second digital signature algorithm 103-2) both (i) reduces information entropy input for the second digital signature algorithm and (ii) does not directly link the first and second digital signature algorithms (e.g. they are calculated completely independently). Security of a system 400 in FIG. 4a with a device 430 and a server 101 is increased by directly linking the first digital signature algorithm 103-1 with the second digital signature algorithm 103-2 by including the first digital signature 410a in the generation or verification of a second digital signature 411a for the second digital signature algorithm 103-2.

For some exemplary embodiments, the Certificate Verify 409c transmitted by server 101 and received by device 430 can omit the first digital signature 410a. For these embodiments, the Certificate Verify 409c can comprise the second digital signature 411a. For these embodiments, then the step 420 by device 430 can generate the calculated first digital signature 410a-1 and omit the input of a received first digital signature 410a into the first digital signature algorithm verification step 421. For these embodiments, then both (i) the step 420b can be omitted and (ii) the calculated first digital signature 410a-1 can be input into the "message to verify" 411a' instead of the received first digital signature 410a (since no first digital signature 410a is received in the Certificate Verify 409c in these embodiments). Consequently, even though the device 430 may not independently verify a first digital signature 410a using a first digital signature algorithm 103-1 in a step 421, a successful second digital signature 411a verification from a step 422 using the second digital signature algorithm 103-2 depends on both (i) a first digital signature algorithm 103-1 (for generating a calculated first digital signature 410a-1), and (ii) the second digital signature algorithm 103-2. In this manner and for the exemplary embodiment described within this paragraph, a system 400 can be secured through the use of both the first digital signature algorithm 103-1 (and first server certificate cert1.server 103-1) and second digital signature algorithm 103-2 (and second server certificate cert2.server 103-2), which can provide greater security than from the use of a single digital signature algorithm.

FIG. 5

Figure 5:
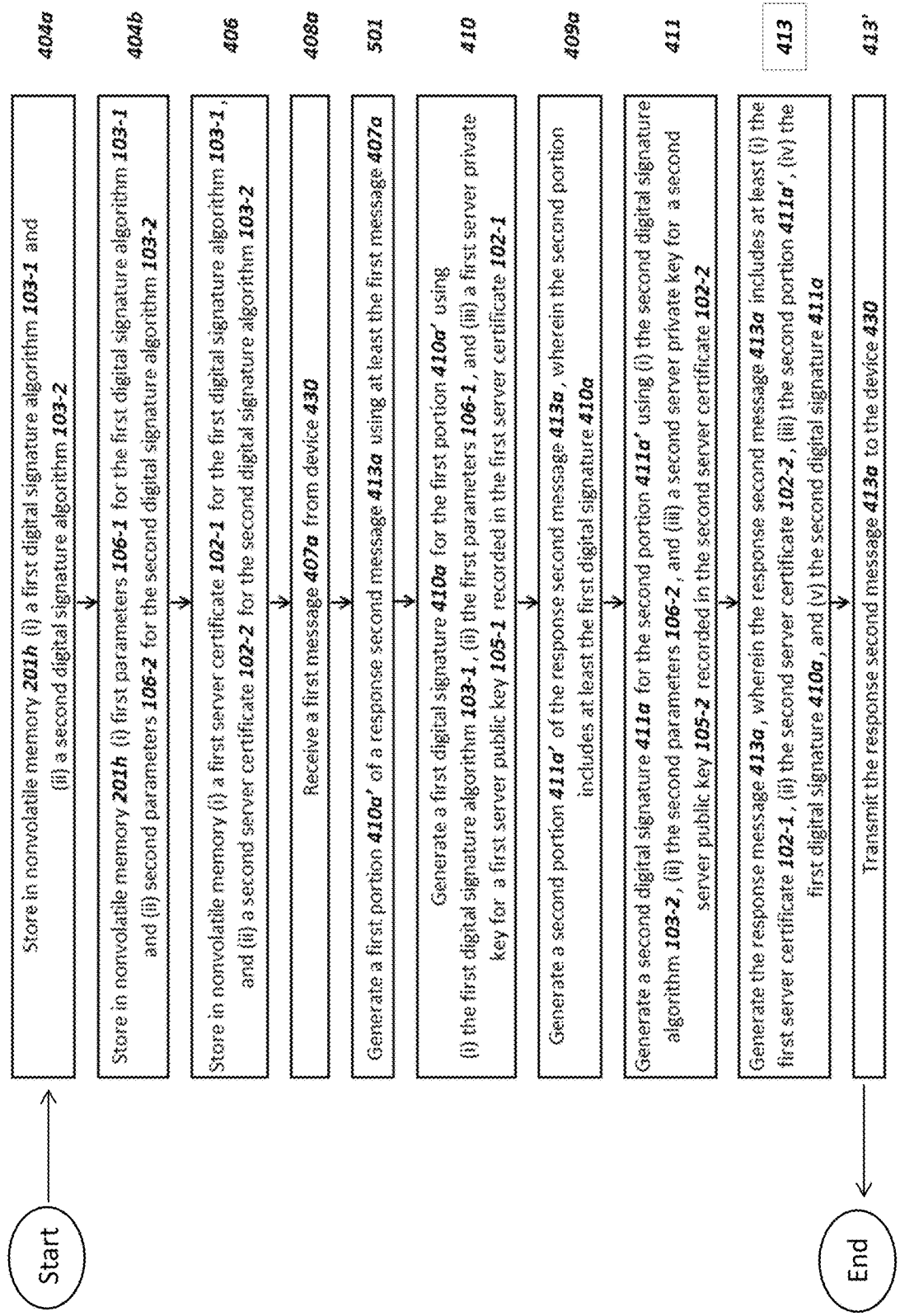
FIG. 5 is a flow chart illustrating exemplary steps for a server to authenticate with a device using first and second digital signature algorithms, in accordance with exemplary embodiments.

FIG. 5 is a flow chart illustrating exemplary steps for a server to authenticate with a device using first and second digital signature algorithms, in accordance with exemplary embodiments. The steps and components depicted in FIG. 5 for a server 101 are also depicted and described in connection with FIG. 4a and FIG. 4b above. The exemplary step 404 in FIG. 4a can comprise steps 404a, and 404b in FIG. 5. The depicted steps for a step 404 can be conducted during server 101 configuration. The depicted steps for a step 404 could also be conducted by an owner or operator of server 101 before server 101 receives a "Client Hello" message 407a as depicted in FIG. 4a. Server 101 can use computing hardware 201 in server 101 to conduct the steps in FIG. 5, where computing hardware 201 is depicted and described in connection with FIG. 2 above and also FIG. 7 below.

At step 404a, server 101 can store in nonvolatile memory 201h (i) a first digital signature algorithm 103-1 and (ii) a second digital signature algorithm 103-2. The first digital signature algorithm 103-1 can support classical cryptography such as RSA or ECC based algorithms, which are also described above in connection with FIG. 1 and FIG. 2. The second digital signature algorithm 103-2 can support post-quantum cryptography (PQC), including a digital signature algorithm based on lattices, multivariate algorithms, or hash-based algorithms. Or, in some embodiments the first digital signature algorithm 103-1 could support PQC and the second digital signature algorithm could support classical cryptography. In other embodiments, the first digital signature algorithm 103-1 can support a first PQC algorithm (such as, but not limited to, based on lattices), and the second digital signature algorithm 103-2 can support a second PQC algorithm (such as, but not limited to, based on zero knowledge proofs).

At step 404b, server 101 can store in nonvolatile memory 201h (i) first parameters 106-1 for the first digital signature algorithm 103-1 and (ii) second parameters 106-2 for the second digital signature algorithm 103-2. Parameters 106 were depicted and described in connection with FIG. 1 and FIG. 2 above, as well as other Figures herein. At step 406, server 101 can store in nonvolatile memory (i) a first server certificate 102-1 for the first digital signature algorithm 103-1, and (ii) a second server certificate 102-2 for the second digital signature algorithm 103-2. Data for the first and second server certificates 102-1 and 102-2 could be processed by server 101 in a step 405 as depicted and described in connection with FIG. 4*a*. The first and second server certificates 102-1 and 102-2 could be received from a certificate issuer 104 in a message 405*c* as depicted and described in connection with FIG. 4*a*. In exemplary embodiments, the first server certificate 102-1 can support the first parameters 106-1, and the second server certificate 102-2 can support the second parameters 106-2.

At step 408*a*, server 101 can receive and process a "Client Hello" first message 407*a* from device 430. Server 101 could process the data by separating the "Client Hello" message 407*a* into different segments or fields and storing the data from "Client Hello" message 407*a* in RAM memory 201*f*. Server 101 could use a network interface 201*k* connected to a system bus 201*n* in order to receive the "Client Hello" message and transfer the message through the system bus 201*n* to a processor 201*p*, which can write the data from the "Client Hello" message 407*a* to the RAM memory 201*f*. The "Client Hello" first message 407*a* from device 430 is also depicted and described in connection with FIG. 4*a* above.

At step 501, server 101 can generate a first portion 410*a*' of a response second message 413*a* using at least the first message 407*a*. In exemplary embodiments, the first portion 410*a*' can correspond to a first "message to sign" or first "data for signature" 410*a* as depicted and described in connection with FIG. 4*b*. In a step 501, server 101 could read Extensions 407*c* received in a "Client Hello" first message 407*a* in order to select compatible cryptographic parameters, such as the first digital signature algorithm 103-1 and the second digital signature algorithm 103-2. In a step 501, server 101 could also select (i) a first server certificate 102-1 for the first digital signature algorithm 103-1 and (ii) a second server certificate 102-2 for the second digital signature algorithm 103-2. In a step 501, server 101 could use first parameters 106-1 and second parameters 106-2 specified or received in a message 407*a* in order to select (i) a first server certificate 102-1 for the first digital signature algorithm 103-1 and (ii) a second server certificate 102-2 for the second digital signature algorithm 103-2.

In a step 501, server 101 could also select the first and second server certificates 102-1 and 102-2 to be supported by the certificate issuer 104 with identity.CI 104*i* and CI root certificates 301*a*-1 and 301*a*-2 stored and used by device 430, such as within a "certificate authorities" field or value within Extensions 407*c*. At step 501, server 101 can process or generate the first portion 410*a*' of a response second message 413*a*, where the first portion can comprise data for signature 410*a*' as depicted and described in connection with FIG. 4*b* above. In exemplary embodiments, the data for signature 410*a*' or first "message to sign" 410*a* can comprise at least a server asymmetric ciphertext 408*b*' value, the selected first server certificate 102-1, the selected second server certificate 102-2, a server key share value 408*d*', and a random number generated by device 430 and received by the server 101. Note that other extensions and additional values or extensions could be included in the first "message to sign" 410*a*. The depicted "first portion 410*a*'" can be the same as the first "message to sign" 410*a* described above.

At step 410, server 101 can generate a first digital signature 410*a* for the first portion 410*a*' using (i) the first digital signature algorithm 103-1, (ii) the first parameters 106-1, and (iii) a first server private key for a first server public key 105-1 recorded in the first server certificate 102-1. A step 410 and the first portion 410*a*' are depicted and described in connection with FIG. 4*b* above.

At step 409*a*, server 101 can include the first digital signature 410*a* output from a step 410 to generate a second portion 411*a*' of the response message 413*a*, wherein the second portion includes at least the first digital signature 410*a*. In exemplary embodiments, the second portion 411*a*' can correspond to a second "message to sign" or second "data for signature" 411*a*' as depicted and described in connection with FIG. 4*b*. For some exemplary embodiments, the second portion 411*a*' of the response message 413*a* can also include the first portion 410*a*' within the second portion 411*a*', where this embodiment is depicted in FIG. 4*b*. Note that in exemplary embodiments, the first portion 410*a*' and the second portion 411*a*' do not need to be sent separately in a response second message 413*a* (such as the first portion 410*a*' being sent twice if included in the second portion 411*a*'), and the application or transport layer protocol used to communication between server 101 and device 430 could specify the data transmitted a single time for structure and data within the first portion 410*a*' and second portion 411*a*'.

At step 411, server 101 can generate a second digital signature 411*a* for the second portion 411*a*' using (i) the second digital signature algorithm 103-2, (ii) the second parameters 106-2, and (iii) a second server private key for a second server public key 105-2 recorded in the second server certificate 102-2. A step 411 and the second portion 411*a*' are depicted and described in connection with FIG. 4*b* above.

At step 413, server 101 can generate, assemble, or compose the response second message 413*a*, wherein the response message 413*a* includes at least (i) the first server certificate 102-1, (ii) the second server certificate 102-2, (iii) the second portion 411*a*', (iv) the first digital signature 410*a*, and (v) the second digital signature 411*a*. For embodiments where the second portion 411*a*' comprises the first digital signature 410*a*, then a step 413 could also include specify that data for the first portion 410*a*' would be in the response second message 413*a*. A step 413 could also include the server asymmetric ciphertext 408*b*' generated in a step 408*b* by server 101 within the response second message 413*a*.

At step 413' server 101 can transmit the response message 413*a* to the device 430 via the IP network 401, where the transmission of a response message 413*a* is depicted and described in connection with FIG. 4*a* above. Server 101 could use a network interface 201*k* connected to IP network 401 in order to transmit the response message 413*a*. The response message 413*a* can comprise a "Server Hello" message supporting transport layer security, although other protocols for secure sessions or communication of data between server 101 and device 430 could be utilized as well. After a step 413', device 430 could conduct the steps for device 430 depicted and described below in connection with FIG. 6 in order for device 430 to use the data in message 413*a* to authenticate the server 101.

The steps and data processing for a server 101 in FIG. 5 and also depicted address the needs in the art described above, such that a server 101 can concurrently use both classical cryptography and post-quantum cryptography in order to authenticate the server 101 with a device 430. The security of a system 400 depicted in FIG. 4*a* can be increased by server 101 using the first digital signature 410*a* as input into the "message to sign" second portion 411*a*' for generating the second digital signature 411*a*. The system can also be more compatible and require fewer modifications to previously existing and deployed software or firmware for conducting secure sessions, where the existing and deployed software or firmware implements protocol can be designed to support a single digital signature for a "CertificateVerify" 409c value or equivalent. The "CertificateVerify" 409c value could comprise the second digital signature 411a, and the first digital signature 410a could also be included in the response second message 413a.

FIG. 6

Figure 6:
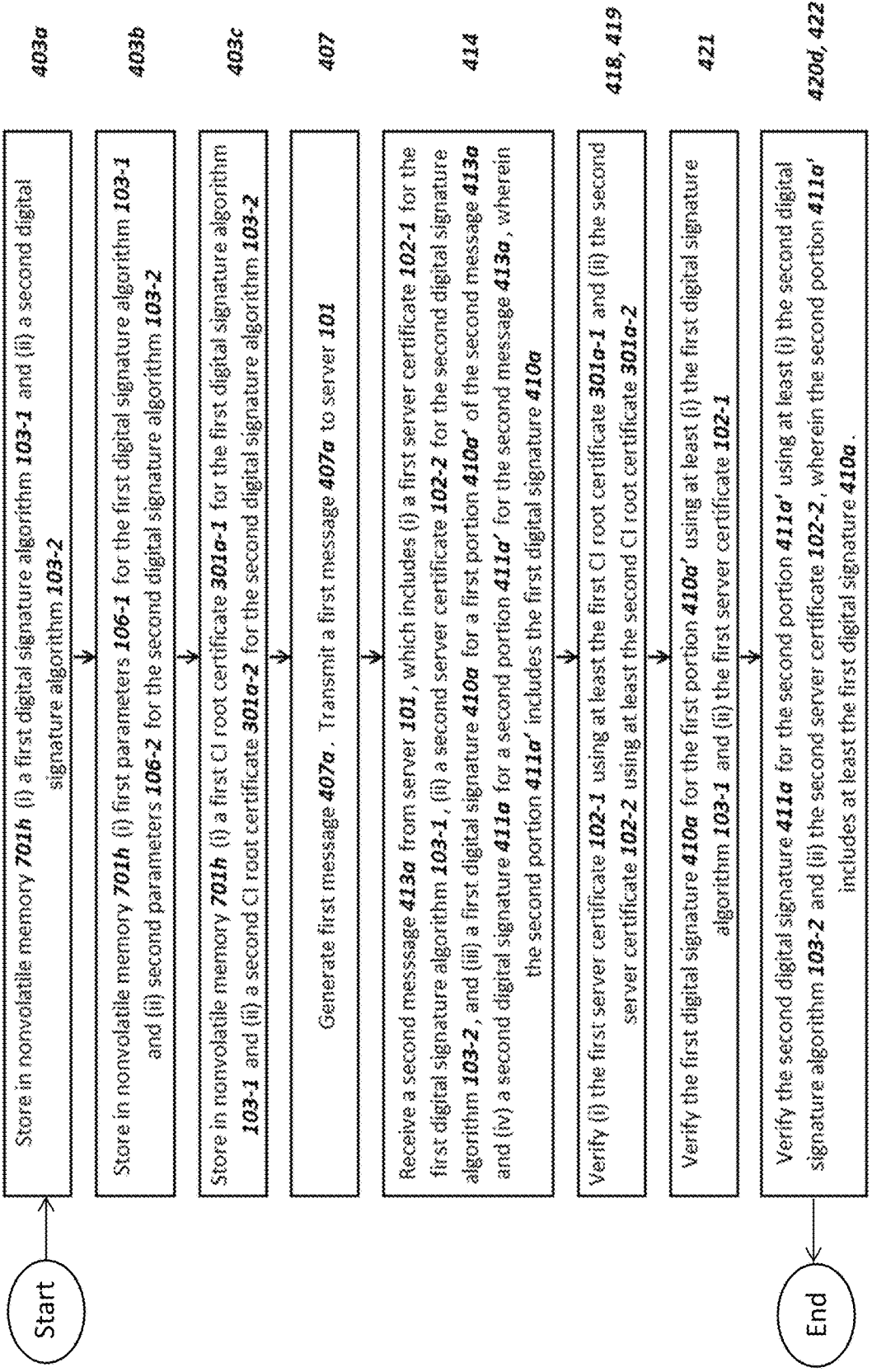
FIG. 6 is a flow chart illustrating exemplary steps for a device to authenticate a server using first and second digital signature algorithms, in accordance with exemplary embodiments.

FIG. 6 is a flow chart illustrating exemplary steps for a device to authenticate a server using first and second digital signature algorithms, in accordance with exemplary embodiments. The steps and components depicted in FIG. 6 for a device 430 are also depicted and described in connection with FIG. 4a and FIG. 4c above. The exemplary step 403 in FIG. 4a can comprise steps 403a, 403b, and 403c. The depicted steps for a step 403 can be conducted during device 430 manufacturing and/or during device 430 configuration. The depicted steps for a step 403 could also be conducted by a user or owner of device 430 before device 430 transmits a "Client Hello" message 407a as depicted in FIG. 4a. Device 430 can use computing hardware 701 in device 430 to conduct the steps in FIG. 6, where computing hardware 701 is depicted and described in connection with 4a and also FIG. 7 below.

At step 403a, device 430 can store in nonvolatile memory 701h (i) a first digital signature algorithm 103-1 and (ii) a second digital signature algorithm 103-2. The first digital signature algorithm 103-1 can support classical cryptography such as RSA or ECC based algorithms, which are also described above in connection with FIG. 1 and FIG. 2. The second digital signature algorithm 103-2 can support post-quantum cryptography (PQC), including a digital signature algorithm based on lattices, multivariate algorithms, or hash-based algorithms. Or, in some embodiments the first digital signature algorithm 103-1 could support PQC and the second digital signature algorithm could support classical cryptography. In another exemplary embodiment, both the first and second digital signature algorithms could support post-quantum cryptography algorithms.

At step 403b, device 430 can store in nonvolatile memory 701h (i) first parameters 106-1 for the first digital signature algorithm 103-1 and (ii) second parameters 106-2 for the second digital signature algorithm 103-2. Parameters 106 were depicted and described in connection with FIG. 1 and FIG. 2 above, as well as other Figures herein. At step 403c, device 430 can store in nonvolatile memory 701h (i) a first certificate issuer root certificate 301a-1 for the first digital signature algorithm 103-1 and (ii) a second certificate issuer root certificate 301a-2 for the second digital signature algorithm 103-2. An exemplary first certificate issuer root certificate 301a-1 and second certificate issuer root certificate 301a-2 were depicted and described in connection with FIG. 3 above. In exemplary embodiments, both a step 403a and step 403d by device 430 could be conducted by a secure processing environment (SPE) and protected memory for a device 430 as depicted and described in connection with FIG. 7 below.

At step 407, device 430 can generate a message 407a for server 101 using the data stored and processed in a step 403 and steps 403a through 403c described above. A step 407 can also include device 430 connecting to an IP network 401 with a network interface 701k in computing hardware 701. Memory in device 430 can also store a domain name and/or IP address for server 101 connected to IP network 401. Step 407 was also depicted and described in connection with FIG. 4a above. Message 407a could comprise a first "Client Hello" message supporting transport layer security (TLS) with selected Extensions 407c and a device key share 407b value. Message 407a could also be formatted or support other secure session protocols as well, such as IP Security (IPSec), Secure Shell (SSH), a virtual private network (VPN), and also datagram transport layer security (DTLS). Message 407a was also depicted and described in connection with FIG. 4a above. A step 407 can include device 430 sending or transmitting the message 407a to the server 101 through the IP network 401.

At step 414, device 430 can receive and process a second "Server Hello" message 413a in response to the "Client Hello" message 407a. Device 430 could process the data by separating the "Server Hello" message 413a into different segments or fields and storing the data from "Server Hello" message 413a in RAM memory 701f. The second message 413a from server 101, can include (i) a first server certificate 102-1 for the first digital signature algorithm 103-1, (ii) a second server certificate 102-2 for the second digital signature algorithm 103-2, and (iii) a first digital signature 410a for a first portion 410a' of the second message 413a and (iv) a second digital signature 411a for a second portion 411a' for the second message 413a, wherein the second portion 411a' includes the first digital signature 410a. The (i) first server certificate 102-1 for the first digital signature algorithm 103-1 and (ii) the second server certificate 102-2 for the second digital signature algorithm 103-2 are depicted and described in connection with FIG. 2 and FIG. 4a. The (i) first digital signature 410a for a first portion 410a' of the second message 413a and (ii) the second digital signature 411a for a second portion 411a' for the second message 413a are depicted and described in connection with FIG. 4a and FIG. 4c. Note that a second message 413a can also include a server key share 408a for either (i) a key exchange or (ii) a key encapsulation mechanism in order for the device 430 and server 101 to mutually obtain a shared secret for subsequent data encryption and decryption. The second message 413a from server 101 can also include an asymmetric ciphertext 408b' generated by a server 101 in a step 408b and a server key share 408d' generated by a server 101 in a step 408d.

At steps 418 and 419, device 430 can verify (i) the first server certificate 102-1 using at least the first CI root certificate 301a-1 and (ii) the second server certificate 102-2 using at least the second CI root certificate 301a-2. Steps 418 and 419 were depicted and described for a device 430 in connection with FIG. 4a. A step 418 can comprise device 430 verifying both (i) the first server certificate 102-1 and (ii) the second server certificate 102-2 with intermediate certificate issuer certificates such as those depicted in FIG. 3. A step 419 can comprise device 430 verifying the intermediate certificate issuer certificates for the first digital signature algorithm 103-1 with the first CI root certificate 301a-1. A step 419 can comprise device 430 verifying the intermediate certificate issuer certificates for the second digital signature algorithm 103-2 with the second CI root certificate 301a-2.

At step 421, device 430 can verify the first digital signature 410a for the first portion 410a' using at least (i) the first digital signature algorithm 103-1 and (ii) the first server certificate 102-1. A step 421 was depicted and described in connection with FIG. 4c. At step 420d, device 430 can process, read, or structure a second portion 411a' of the message 413a, wherein the second portion 411a' of the message 413a includes at least the first digital signature 410a. A step 420d was depicted and described in connection with FIG. 4c above. In some exemplary embodiments, the second portion 411a' of the message 413a can also include the first portion 410a' used to verify the first digital signature 410a. A second portion 411a of the message 413a is also depicted and described in connection with FIG. 4c above. At a step 422, device 430 can verify the second digital signature 411a for the second portion 411a' using at least (i) the second digital signature algorithm 103-2 and (ii) the second server certificate 102-2, wherein the second portion 411a' includes at least the first digital signature 410a. A step 422 was depicted and described in connection with FIG. 4c.

Upon conclusion of the steps depicted for device 430 in FIG. 6, device 430 can determine that server 101 is authenticated for both the first digital signature algorithm 103-1 and the second digital signature algorithm 103-2. Device 430 could then take subsequent steps such as a step 423 to derive a master secret and encrypt data in a step 424 using the master secret, which are depicted and described in connection with FIG. 4a. The steps and data processing for a device 430 in FIG. 6 and also depicted address the needs in the art described above, such that a device 430 can concurrently use both classical cryptography and post-quantum cryptography in order to authenticate a server 101. The security of a system 400 depicted in FIG. 4a can be increased by device 430 using the first digital signature 410a as input into the "message to verify" second portion 411a' for validating the second digital signature 411a. The system can also be more compatible and require fewer modifications to previously existing and deployed software or firmware for conducting secure sessions, where the existing and deployed software or firmware implements protocol designed to support a single digital signature for a "CertificateVerify" 409c value or equivalent.

FIG. 7

FIG. 7 is a graphical illustration of hardware, firmware, and software components for a server and a device, in accordance with exemplary embodiments. FIG. 7 is illustrated to include several electrical components that can be common within a server 101 and a device 430. Server 101 can include or operate with server computing hardware 201, and exemplary server computing hardware 201 was also depicted and described in connection with FIG. 2 above. FIG. 7 provides additional details regarding the components and operation of server computing hardware 201. Device 430 can include or operate with device computing hardware 701.

Server 101 may consist of multiple electrical components in order to communicate with both (i) a plurality of devices 430 and at least (ii) one certificate issuer 104, as depicted and described in connection with FIG. 4a above. In exemplary embodiments and as depicted in FIG. 7, server 101 can include or comprise a server identity 101a, a processor 201p (depicted as "CPU 201p"), random access memory (RAM) 201f, an operating system (OS) 201g, storage memory 201h (depicted as "nonvolatile memory 201h"), a Wide Area Network (WAN) interface 201k, a system bus 201n, and a user interface (UI) 201y. WAN interface 201k can also be referred to as network interface 201k.

Server identity 101a could comprise a preferably unique alpha-numeric or hexadecimal identifier for server 101, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a server 101 connected to an IP network 401. Server identity 101a can preferably be recorded in a non-volatile memory 201h and recorded by a user via the user interface 201y upon configuration of a server 101, such as during a configuration step 404 depicted and described in connection with FIG. 4c above. Server identity 101a may also be a number or string to identify an instance of server 101 running in a cloud or virtual networking environment.

In exemplary embodiments, server 101 can operate with multiple different server identities 101a, such as a first server identity 101a comprising a DNS name and a second server identity 101a comprising an IP address and a port number. A third server identity 101a could comprise an MAC address for WAN interface 201k. A fourth server identity 101a can comprise an identifier for an instance of a virtual machine operating in a cloud networking environment. A different server 101 could be associated with a different IP address and port number or a different MAC address for WAN interface 201k. In exemplary embodiments, (i) a server 101 with a first server identity 101a can operate with a first Internet Protocol address and port (IP:port) number with a first set of server extensions 407c and (ii) a second or different server 101 with a second server identity 101a can operate with a second IP:port number and a second set of server extensions 407c. Other possibilities exist as well for the use of a plurality of different server identities 101a without departing from the scope of the present disclosure.

The CPU 201p can comprise a general purpose processor appropriate for higher processing power requirements for a server 101, and may operate with multiple different processor cores. CPU 201p can comprise a processor for server 101 such as an ARM® based process or an Intel® based processor such as belonging to the XEON® family of processors, and other possibilities exist as well. For some exemplary embodiments, the CPU 201p can be based on a processor using the RISC-V architecture. CPU 201p can utilize bus 201n to fetch instructions from RAM 201f and operate on the instruction. CPU 201p can include components such as registers, accumulators, and logic elements to add, subtract, multiply, and divide numerical values and record the results in RAM 201f or storage memory 201h, and also write the values to an external interface such as WAN interface 201k. In exemplary embodiments, CPU 201p can perform the mathematical calculations for digital signature algorithms such as a first digital signature algorithm 410 and a second digital signature algorithm 411, symmetric ciphering, etc. depicted and described in connection with in FIG. 4b, FIG. 5, etc., above. A CPU 201p could also comprise a "system on a chip" (SOC) with a plurality of cores, including examples of the Amazon Graviton family of processors such as the Graviton 2 or the Apple "M" family of processors such as the Ml For a server 101 operating as a virtual machine or a container such as, but not limited to, within Docker or Kubernetes, the server 101 could be allocated a portion of a physical processor CPU 201p from a host operating system in order for the server 101 to conduct processing and computational steps as contemplated herein. The portion of a physical processor CPU 201p for the server 101 could comprise different embodiments without departing from the scope of the present disclosure. A CPU 201p for a server 101 could comprise a "time slice" of a physical SOC within a physical host server (such as repeated brief periods of time on the order of milliseconds or less for CPU 201p) that is shared with other processes or virtual machines running on the host. The CPU 201p for a server 101 could comprise a dedicated (for a period of time) processing core of a physical SOC within a physical host server. Or, the CPU 201p for a first server could comprise a combination of the allocation of resources from a physical SOC within a physical host server as described in the previous two sentences.

CPU 201p can also include a secure processing environment (SPE) 201u in order to conduct digital signature operations and algorithms, such as, but not limited to, (i) conducting a first digital signature algorithm 103-1 signature generation step 410 depicted and described in connection with FIG. 4b above and (ii) conducting a second digital signature algorithm 103-2 signature generation step 411 depicted and described in connection with FIG. 4b above. In exemplary embodiments step 409 which can include both step 410 and 411 from FIG. 4b can be conducted within SPE 201u. SPE 201u can comprise a dedicated area of silicon or transistors within CPU 201p in order to isolate the digital signature operations from other programs or software operated by CPU 201p, including many processes or programs running operating system 201g.

SPE 201u could contain RAM memory equivalent to RAM 201f and nonvolatile memory equivalent to storage memory 201h, as well as a separately functioning processor on a smaller scale than CPU 201p, such as possibly a dedicated processor core within CPU 201p. SPE 201u can comprise a "secure enclave" or a "secure environment", based on the manufacturer of CPU 201p. SPE 201u can also be referred to as a "trusted execution environment" (TEE). An internal bus equivalent to system bus 201n could electrically connect SPE 201u with other cores in CPU 201p, where the other cores 201p could comprise a "Rich Execution Environment" (REE). In some exemplary embodiments, an SPE 201u can be omitted and the CPU 201p can conduct secure digital signature operations or calculations without an SPE 201u.

For some exemplary embodiments CPU 201p could include a "Rich Execution Environment" (REE), which can comprise cores for normal operation of processes and algorithms that do not require the higher security level of a secure processing environment (SPE). Some operations and steps contemplated herein can be conducted within the REE, such as step 408a and step 413 which are depicted and described in connection with FIG. 4a.

A processor 201p for server 101 could include a hardware random number generator 128. The hardware random number generator 128 can use a sensor such as a sensor in server 101 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate both (i) the private key for a first public key PK1.Server 105-1 depicted and described in connection with FIG. 4b above, and (ii) the private key for a second public key PK2. Server 105-2 depicted and described in connection with FIG. 4b above.

RAM 201f may comprise a random access memory for server 101. RAM 201f can be a volatile memory providing rapid read/write memory access to CPU 201p. RAM 201f could be located on a separate integrated circuit in server 101 or located within CPU 201p. The RAM 201f can include data recorded in server 101 for the operation when communicating with a plurality of devices 430 or a certificate issuer 104. RAM 201f may be connected to CPU 201p using a system bus 201n which could comprise a memory bus, such as supporting DDR5 RANI memory and other possibilities exist as well. As depicted and described in connection with FIG. 2 above, RAM 201f could also include an operating system 201g, or components of an operating system 201g such as a kernel, and other components of operating system 201g, such as some supporting libraries could be stored within storage memory 201h.

The system bus 201n may be any of several types of bus structures including a memory bus or memory controller, a peripheral bus, and a local bus using any of a variety of bus architectures including a data bus. System bus 201n connects components within server 101 as illustrated in FIG. 7, such as transferring electrical signals between the components illustrated. Server 101 can include multiple different versions of bus 201n to connect different components, including a first system bus 201n between CPU 201p and RAM 201f (which could be a memory bus), and a second system bus 201n between CPU 201p and WAN interface 201k, which could be an I2C bus, an SPI bus, a PCIe bus, or similar data busses. The system bus 201n may also be referred to as a data bus, and can comprise multiple different segments, such as a first portion of a data bus connecting the RAM 201f to the processor 201p as shown, and a second portion of a data bus connecting the processor 201p to the WAN interface 201k.

Although the depicted system bus 201n in FIG. 7 is illustrated to connectivity between the different hardware components, other configurations are possible to link the hardware components depicted without departing from the scope of the present invention. As one example, although the WAN interface 201k is depicted as connected to the nonvolatile memory 201h, the WAN interface 201k may be connected to the processor 201p. In order to receive data from an IP network 401 depicted in FIG. 4a, a packet or message such as message 407c could be received from the WAN interface 201k and the system bus 201n could transfer the data to the processor 201p (without requiring to pass through the nonvolatile memory 201h). The processor 201p could subsequently write the data from message 407c to RANI 201f. Likewise, when sending or transmitting a message from server 101 such as a message 413a, a system bus 201n or first portion of a data bus could transfer the data for a message 413a from the RAM 201f to the processor 201p and a second portion of a data bus could transfer the data for a message 413a from the processor 201p to the WAN interface 201k. The operation of the first portion of the data bus and the second portion of the data bus can be referred to as a single data bus for system bus 201n.

In exemplary embodiments, RANI 201f operating with server 101 can record values and algorithmic steps or computer instructions for conducting or performing two digital signature algorithms such as with the embodiment for a step 409 depicted and described in connection with FIG. 4b above. RAM 201f may also store the message 407a received from a device 430. RAM 201f can also store server extensions 407c, where server extensions 407c can specify the cryptographic algorithms and parameters supported by server 101. RANI 201f may store the computer executable instructions for conducting the steps and associated variables and values or constants for steps and/or data 408a, 408b, 408c, and 408d (depicted in FIG. 7 as "408"), 410a' 410, 410a, 411a', 411, 411a, 413, and 407c, which are depicted and described in connection with FIG. 4a above and also previous Figures herein. Note that some portions of RAM 201f depicted in FIG. 7 can comprise protected memory, such that only SPE 201u can access the protected memory within RAM 201f and the REE of CPU 201p cannot access the protected memory within RAM 201f. For these embodiments, then the computer executable instructions for step and/or data 410, 410a, 411, can be within the protected memory of RANI 201f.

The exemplary steps depicted in RAM 201f listed in the paragraph above can comprise computer executable instructions for the processor CPU 201p as well as memory cells for storing constants and variables associated with conducting the computer executable instructions. The computer executable instructions for the different steps can be stored in storage memory 201h when the server 101 is powered off or in an extended sleep state (such as, but not limited to, greater than 10 seconds). The computer executable instructions can be moved by an OS 201g from the storage memory 201h to the RANI 201f during a boot process or a process for the server 101 to begin supporting communications with at least one device 430.

As contemplated herein, for some embodiments the protected memory for SPE 201u may reside within SPE 201u and the protected memory can include both (i) the private key for a first public key PK1.Server 105-1, and (ii) the private key for a second public key PK2.Server 105-2. For these embodiments, then the hardware random number generator 128 can also be within SPE 201u.

Note that the associated data or values for the steps can also be stored within RANI 201f for a period of time to both conduct the step and use the resulting data in subsequent steps. As one example, in a step 410 for a first digital signature algorithm to generate a first digital signature 410a based on first data for signature 410a' (depicted and described in connection with FIG. 4b above), the output from a step 410 comprising a first digital signature 410a can be stored in RAM 201f and be input or included in second data for signature 411a' for a second digital signature algorithm and step 411. In other words and as one example, the depiction of a step 410 in RAM 201f can include both (i) the computer executable instructions to conduct the step and (ii) the data or values associated with the step such as the first digital signature 410a generated or processed by the step. Consequently, a step depicted in RAM 201f can include all of the associated data and instructions or logic to conduct the step, where details for the steps are depicted in the Figures above.

The output of the first digital signature algorithm 103-1 and signature generation step 410 can comprise the first digital signature 410a, which could also be stored within RAM 201f and within physical memory associated with a step 410 allocated to RAM 201f. Likewise, the output of a step 411 for the second digital signature algorithm 103-2 can comprise the second digital signature 411a and also be stored in RAM 201f. In other words, the data and computer executable instructions for conducting a step 409 depicted and described in connection with FIG. 4b and also FIG. 4a can be stored within RANI 201f.

For some data within RAM 201f for step 410 or step 411, the depicted data for these steps or recited data from the previous paragraph could comprise a pointer within RAM 201f for these steps, such that the data could be recorded or stored within RAM 201f in a different location within RAM 201f than the memory allocated to data for step 410 or step 411 within RAM 201f. As another example for RAM 201f within server 101 or allocated to server 101, RAM 201f could store both computer executable instructions and associated values for a step 408, were a step 408 can comprise the substeps 408a, 408b, and 408c as depicted and described in connection with FIG. 4a above. The substep 408a within RANI could include the data from message 407a.

The operating system (OS) 201g can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 201h, etc. The operating system 201g may include timers and schedulers for managing the access of software to hardware resources within server 101, where the hardware resources managed by OS 201g can include CPU 201p, RAM 201f, nonvolatile memory 201h, and system bus 201n, and well as connections to the IP network 401 via a WAN interface 201k and also the certificate issuer 104. The operating system shown of 201g can be appropriate for a higher power computing device with more memory and CPU resources (compared to a device 430). Example operating systems 201g for a server 101 includes Linux or Windows® Server, and other possibilities exist as well. Although depicted as a separate element within server 101 in FIG. 7, OS 201g may reside in RAM 201f and/or nonvolatile memory 201h during operation of server 101.

As depicted in FIG. 7, OS 201g in FIG. 7 can contain algorithms, programs, or computer executable instructions (by processor 201p or SPE 201u) for conducting communications with device 430 and with the certificate issuer 104 as depicted and described in connection with FIG. 4a, including the steps to process the receipt of a message 407a and transmit or send a message 413a. An OS 201g can also include the executable instructions for processor 201p to parse and interpret messages, such as but not limited to, a message 407a in a step 408a as depicted and described above in connection with FIG. 4a. OS 201g can include libraries and drivers such that the message 413a could be assembled based on the output and data from the series of steps 408a through 413 depicted and described in connection with FIG. 4a, and then the OS 201g could write the data for message 413a via the system bus 201n to the WAN interface 201k, where the WAN interface 201k can subsequently transmit the message 413a to the IP network 401.

An OS 201g can also include the executable instructions for processor 201p to receive messages such as, but not limited to, a message 407a as depicted and described above in connection with FIG. 4a. In other words, OS 201g can include libraries and drivers such that the message 407a could be received from the IP network 410 using the WAN interface 201k and system bus 201n. The OS 201g could parse the data received in a message 407a and store contents from the message 407a in RAM 201f such that the server 101 could conduct the subsequent steps using the data from the message 407a. The OS 201g could write data from the message 407a to RAM 201f, and then the computer executable steps in RAM 201f such as associated with steps 408a through 413 depicted and described in connection with FIG. 4a could process the data from a message 407a. OS 201g could also include computer executable instructions for performing the steps 404 and 405 as depicted and described in connection with FIG. 4a.

Nonvolatile memory 201h or "storage memory" 201h (which can also be referred to herein as "memory 201h") within server 101 can comprise a non-volatile memory for long-term storage of data, including times when server 101 may be powered off or within an extended sleep state such as a sleep state longer than a few seconds. Memory 201h may be a NAND flash memory or a NOR flash memory and record firmware for server 101, such as a bootloader program and OS 201g. Memory 201h can record long-term and non-volatile storage of data or files for server 101. In an exemplary embodiment, OS 201g is recorded in memory 201h when server 101 is powered off, and portions of memory 201h are moved by CPU 201p into RANI 201f using a boot loader when server 101 powers on.

Memory 201h (i) can be integrated with CPU 201p into a single integrated circuit (potentially as a "system on a chip"), or (ii) operate as a separate integrated circuit or a removable card or "disk", such as a solid state drive (SSD).

Storage memory 201*h* can also comprise a plurality of spinning hard disk drives in a redundant array of independent disks (RAID) configuration. Memory 201*h* may also be referred to as "server storage" and can include exemplary file systems of FAT16, FAT 32, NTFS, ext3, ext4, UDF, or similar file systems. As contemplated herein, the terms "memory 201*h*", "storage memory 201*h*", and "nonvolatile memory 201*h*" can be considered equivalent. As depicted in FIG. 7, non-volatile memory 201*h* can record digital signature algorithms 103-1 and 103-2, cryptographic parameters 106-1 and 106-2, server certificates 102-1 and 102-2, and at least on server identity of 101*a*.

Server 101 can include a WAN interface 201*k* to communicate with IP network 401 and a plurality of devices 430, as depicted in FIG. 4*a* above (where FIG. 4*a* depicts a single device 430). WAN interface 201*k* can comprise either a wired connection such as Ethernet or a wireless connection. For wireless configurations of server 101, then WAN interface 201*k* can comprise a radio, which could connect with an antenna in order to transmit and receive radio frequency signals. For a wireless configuration of server 101, WAN interface 201*k* within server 101 can provide connectivity to an IP network 401 through 3GPP standards such as 3G, 4G, 4G LTE, and 5G networks, or subsequent and similar standards including IEEE 802.11. A WAN interface 201*k* may also be referred to as a network interface. In exemplary embodiments, a WAN interface 201*k* may comprise an Ethernet adapter or a fiber optic connection. WAN interface 201*k* may also be a wired or optical connection to a local area network (LAN), where the LAN provides connectivity to IP network 401 depicted and described in connection with FIG. 4*a*.

Server 101 may also optionally include user interface 201*y* which may include one or more sub-servers for receiving inputs and/or one or more sub-servers for conveying outputs. User interfaces are known in the art and may be simple for many servers 101 such as a few LED lights or and LCD display, and thus user interfaces are not described in detail here. User interface 201*y* could comprise a touch screen or screen display with keyboard and mouse, if server 101 has sophisticated interaction with a user, such as a network administrator. Server 101 can optionally omit a user interface 201*y*, if no user input or display is required for establishing communications IP network 401 and devices 430.

Although not depicted in FIG. 7, server 101 can include other components to support operation, such as a clock, power source or power connection, antennas, etc. Other possibilities exist as well for hardware and electrical components operating in a server 101 without departing from the scope of the present disclosure. Using the electrical components depicted in FIG. 7, a server 101 could send and receive the data in FIG. 4*a*, in order to conduct secure communications with a plurality of devices 430.

Device 430 may consist of multiple electrical components in order to communicate with both (i) a plurality of servers 101 over time and at least (ii) one certificate issuer 104, as depicted and described in connection with FIG. 4*a* above. In exemplary embodiments and as depicted in FIG. 7, device 430 can include or comprise a processor 701*p* (depicted as "CPU 701*p*"), random access memory (RANI) 701*f*, an operating system (OS) 701*g*, storage memory 701*h* (depicted as "nonvolatile memory 701*h*"), a Wide Area Network (WAN) interface 701*k*, a system bus 701*n*, and a user interface (UI) 201*y*.

The CPU 701*p* can comprise a general purpose processor appropriate for processing power requirements for a device 430 (which may be lower than the processing requirements for a server 101), and may operate with multiple different processor cores. CPU 701*p* can comprise a processor for device 430 such as an ARM® based process or an Intel® based processor such as belonging to the ATOM® family of processors, and other possibilities exist as well. For some exemplary embodiments, the CPU 701*p* can be based on a processor using the RISC-V architecture. CPU 701*p* can utilize bus 701*n* to fetch instructions from RAM 701*f* and operate on the instruction. CPU 701*p* can include components such as registers, accumulators, and logic elements to add, subtract, multiply, and divide numerical values and record the results in RAM 701*f* or storage memory 701*h*, and also write the values to an external interface such as WAN interface 701*k*. In exemplary embodiments, CPU 701*p* can perform the mathematical calculations for digital signature algorithms and verification such as a first digital signature algorithm 421 and a second digital signature algorithm 422, symmetric ciphering, etc. depicted and described in connection with in FIG. 4*c*, FIG. 6, etc., above. A CPU 701*p* could also comprise a "system on a chip" (SOC) with a plurality of cores, including the Apple "M" family of processors such as the Ml CPU 701*p* can also include a secure processing environment (SPE) 701*u* in order to conduct digital signature verification operations and algorithms, such as, but not limited to, (i) conducting a first digital signature verification step 421 using a first digital signature algorithm 103-1 depicted and described in connection with FIG. 4*c* above and (ii) conducting a second digital signature verification step 422 using a second digital signature algorithm 103-2 depicted and described in connection with FIG. 4*c* above. In exemplary embodiments, step 420, which can include both steps 421 and 422 from FIG. 4*c* can be conducted within SPE 701*u*. SPE 701*u* can comprise a dedicated area of silicon or transistors within CPU 701*p* in order to isolate the digital signature verification operations from other programs or software operated by CPU 701*p*, including many processes or programs running operating system 701*g*. For some exemplary embodiments, SPE 701*u* can comprise a dedicated processing core within CPU 701*p*.

SPE 701*u* could contain RAM memory equivalent to RAM 701*f* and nonvolatile memory equivalent to storage memory 701*h*, as well as a separately functioning processor on a smaller scale than CPU 701*p*, such as possibly a dedicated processor core within CPU 701*p*. SPE 701*u* can comprise a "secure enclave" or a "secure environment", based on the manufacturer of CPU 701*p*. SPE 701*u* can also be referred to as a "trusted execution environment" (TEE). An internal bus equivalent to system bus 701*n* could electrically connect SPE 701*u* with other cores in CPU 701*p*, where the other cores 701*p* could comprise a "Rich Execution Environment" (REE). In exemplary embodiments, SPE 701*u* includes nonvolatile memory to store both (i) a first certificate issuer root certificate 301*a*-1 and (ii) a second certificate issuer root certificate 301*a*-2, such that verification of server certificates in steps 418 and 419 in FIG. 4*a* and FIG. 6 can be secured. In some exemplary embodiments, an SPE 701*u* can be omitted and the CPU 701*p* can conduct secure digital signature verification operations or calculations without an SPE 701*u*.

For some exemplary embodiments CPU 701*p* could include a "Rich Execution Environment" (REE), which can comprise cores for normal operation of processes and algorithms that do not require the higher security level of a secure processing environment (SPE). Some operations and steps contemplated herein can be conducted within the REE, such as step 407 and step 424, which are depicted and described in connection with FIG. 4a.

A processor 701p for device 430 could include a hardware random number generator 128. The hardware random number generator 128 can use a sensor such as a sensor in device 430 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the random number for a message 407a depicted and described in connection with FIG. 4b above.

RAM 701f may comprise a random access memory for device 430. RAM 701f can be a volatile memory providing rapid read/write memory access to CPU 701p. RAM 701f could be located on a separate integrated circuit in device 430 or located within CPU 701p. The RAM 701f can include data recorded in device 430 for the operation when communicating with a server 101. RAM 701f may be connected to CPU 701p using a system bus 701n which could comprise a memory bus, such as supporting DDR5 RAM memory and other possibilities exist as well. As depicted and described in connection with FIG. 2 above, RANI 701f could also include an operating system 701g, or components of an operating system 701g such as a kernel, and other components of operating system 701g, such as some supporting libraries could be stored within storage memory 701h.

The system bus 701n may be any of several types of bus structures including a memory bus or memory controller, a peripheral bus, and a local bus using any of a variety of bus architectures including a data bus. System bus 701n connects components within device 430 as illustrated in FIG. 7, such as transferring electrical signals between the components illustrated. Device 430 can include multiple different versions of bus 701n to connect different components, including a first system bus 701n between CPU 701p and RAM 701f (which could be a memory bus), and a second system bus 701n between CPU 701p and WAN interface 701k, which could be an I2C bus, an SPI bus, a PCIe bus, or similar data busses. The system bus 701n may also be referred to as a data bus, and can comprise multiple different segments, such as a first portion of a data bus connecting the RAM 701f to the processor 701p as shown, and a second portion of a data bus connecting the processor 701p to the WAN interface 701k.

Although the depicted system bus 701n in FIG. 7 is illustrated to connectivity between the different hardware components, other configurations are possible to link the hardware components depicted without departing from the scope of the present invention. As one example, although the WAN interface 701k is depicted as connected to the nonvolatile memory 701h, the WAN interface 701k may be connected to the processor 701p. In order to receive data from an IP network 401 depicted in FIG. 4a, a packet or message such as message 413a could be received from the WAN interface 701k and the system bus 701n could transfer the data to the processor 701p (without requiring to pass through the nonvolatile memory 701h). The processor 701p could subsequently write the data from message 413a to RANI 701f. Likewise, when sending or transmitting a message from device 430 such as a message 407a, a system bus 701n or first portion of a data bus could transfer the data for a message 407a from the RAM 701f to the processor 701p and a second portion of a data bus could transfer the data for a message 407a from the processor 701p to the WAN interface 701k. The operation of the first portion of the data bus and the second portion of the data bus can be referred to as a single data bus for system bus 701n.

In exemplary embodiments, RAM 701f operating with device 430 can record values and algorithmic steps or computer instructions for conducting or performing two digital signature algorithms for verification, such as with the embodiment for a step 420 depicted and described in connection with FIG. 4c above. Although not depicted in FIG. 7, RAM 701f may also store the message 413a received from a server 101. RAM 701f can also store server extensions 407c, where server extensions 407c can specify the cryptographic algorithms and parameters supported by device 430.

RAM 701f may store the computer executable instructions for conducting the steps and associated variables and values or constants for steps and/or data 415, 416, 417, 418, 419, 421, 422, 423, and 101a, which are depicted and described in connection with FIG. 4a above and also previous Figures herein. RAM 701f could also include a step 420 for both a step 421 and a step 422 for digital signature verification algorithms as depicted and described in connection with FIG. 4c above. Note that some portions of RAM 701f depicted in FIG. 7 can comprise protected memory, such that only SPE 701u can access the protected memory within RAM 701f and the REE of CPU 701p cannot access the protected memory within RAM 701f. For these embodiments, then the computer executable instructions for step and/or data 421 and 422, can be within the protected memory of RAM 701f. RAM 701f can also include a server identity 101a, which can be used to select and send data to server 101 such as the message 407a.

The exemplary steps depicted in RAM 701f listed in the above paragraph can comprise computer executable instructions for the processor CPU 701p as well as memory cells for storing constants and variables associated with conducting the computer executable instructions. The computer executable instructions for the different steps can be stored in storage memory 701h when the device 430 is powered off or in an extended sleep state (such as, but not limited to, greater than 10 seconds). The computer executable instructions can be moved by an OS 701g from the storage memory 701h to the RANI 701f during a boot process or a process for the device 430 to begin supporting communications with at least one server 101.

Note that the associated data or values for the steps can also be stored within RANI 701f for a period of time to both conduct the step and use the resulting data in subsequent steps. As one example, in a step 421 for a first digital signature algorithm 103-1 to verify a first digital signature 410a based on first data for signature 410a' (depicted and described in connection with FIG. 4c above), the output from a step 421 comprising a calculated first digital signature 410a can be stored in RAM 701f and be input or included in second data for signature 411a' for a second digital signature verification algorithm and step 422. In other words and as one example, the depiction of a step 421 in RAM 701f can include both (i) the computer executable instructions to conduct the step and (ii) the data or values associated with the step such as the first digital signature 410a generated or processed by the step. Consequently, a step depicted in RAM 701f can include all of the associated data and instructions or logic to conduct the step, where details for the steps are depicted in the Figures above. The output of the first digital signature verification algorithm and step 421 can comprise the first digital signature 410a, which could also be stored within RAM 701f and within physical memory associated with a step 421 allocated to RAM 701f. Likewise, the output of a step 422 for the second digital signature verification algorithm can comprise the second digital signature 411a and also be stored in RAM 701f. In other words, the data and computer executable instructions for conducting a step 420 depicted and described in connection with FIG. 4c and also FIG. 4a can be stored within RAN1 701f.

For some data within RAM 701f for step 421 or step 422, the depicted data for these steps or recited data from the previous paragraph could comprise a pointer within RAM 701f for these steps, such that the data could be recorded or stored within RAM 701f in a different location within RAM 701f than the memory allocated to data for step 421 or step 422 within RAM 701f.

The operating system (OS) 701g can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 701h, etc. The operating system 701g may include timers and schedulers for managing the access of software to hardware resources within device 430, where the hardware resources managed by OS 701g can include CPU 701p, RAM 701f, nonvolatile memory 701h, and system bus 701n, and well as connections to the IP network 401 via a WAN interface 701k. The operating system shown of 701g can be appropriate for a lower power computing device with more memory and CPU resources (compared to a server 101). Example operating systems 701g for a device 430 includes Android, Fuchsia, Linux, IOS, and other possibilities exist as well. Although depicted as a separate element within device 430 in FIG. 7, OS 701g may reside in RANI 701f and/or nonvolatile memory 701h during operation of device 430.

OS 701g could include computer executable instructions and associated values for a step 403, were a step 403 can comprise the substeps 403a, 403b, and 403c as depicted and described in connection with FIG. 6 above. As depicted in FIG. 7, OS 701g in FIG. 7 can contain algorithms, programs, or computer executable instructions (by processor 701p or SPE 701u) for conducting communications with server 101 as depicted and described in connection with FIG. 4a, including the steps to generate a message 407a and receive and process a message 413a. An OS 701g can also include the executable instructions for processor 701p to generate messages, such as but not limited to, a message 407a in a step 407 as depicted and described above in connection with FIG. 4. OS 701g can include libraries and drivers such that the message 413a could be processed based on the input and data from the series of steps 414 through 424 depicted and described in connection with FIG. 4a. Then the OS 701g could write the data for message 425 via the system bus 701n to the WAN interface 701k, where the WAN interface 701k can subsequently transmit the message 425 to the IP network 401.

An OS 701g can also include the executable instructions for processor 701p to transmit messages such as, but not limited to, a message 407a as depicted and described above in connection with FIG. 4a. In other words, OS 701g can include libraries and drivers such that the message 407a could be transmitted to the IP network 410 using the WAN interface 701k and system bus 701n. The OS 701g could use a processor 701p to parse the data received in a message 413a and store contents from the message 413a in RAM 701f such that the device 430 could conduct the subsequent steps using the data from the message 413a. The OS 701g could write data from the message 413a to RAM 701f, and then the computer executable steps in RAM 701f such as associated with steps 414 through 424 depicted and described in connection with FIG. 4a could process the data from a message 413a. OS 701g could also include computer executable instructions for performing the steps 414 and 424 as depicted and described in connection with FIG. 4a.

Nonvolatile memory 701h or "storage memory" 701h (which can also be referred to herein as "memory 701h") within device 430 can comprise a non-volatile memory for long-term storage of data, including times when device 430 may be powered off or within an extended sleep state such as a sleep state longer than a few seconds. Memory 701h may be a NAND flash memory or a NOR flash memory and record firmware for device 430, such as a bootloader program and OS 701g. Memory 701h can record long-term and non-volatile storage of data or files for device 430. In an exemplary embodiment, OS 701g is recorded in memory 701h when device 430 is powered off, and portions of memory 701h are moved by CPU 701p into RANI 701f using a boot loader when device 430 powers on.

Memory 701h (i) can be integrated with CPU 701p into a single integrated circuit (potentially as a "system on a chip"), or (ii) operate as a separate integrated circuit or a removable card or "disk", such as a solid state drive (SSD). Memory 701h may also be referred to as "device storage" and can include exemplary file systems of FAT16, FAT 32, NTFS, ext3, ext4, UDF, or similar file systems. As contemplated herein, the terms "memory 701h", "storage memory 701h", and "nonvolatile memory 701h" can be considered equivalent. As depicted in FIG. 7, non-volatile memory 701h can record digital signature algorithms 103-1 and 103-2, cryptographic parameters 106-1 and 106-2, certificate issuer root certificates 301a-1 and 301a-1. Some portions of non-volatile memory 701h may reside within SPE 701u.

Device 430 can include a WAN interface 701k to communicate with IP network 401 and a plurality of server 101, as depicted in FIG. 4a above (where FIG. 4a depicts a single server 101). WAN interface 701k can comprise either a wired connection such as Ethernet or a wireless connection. For wireless configurations of device 430, then WAN interface 701k can comprise a radio, which could connect with an antenna in order to transmit and receive radio frequency signals. For a wireless configuration of device 430, WAN interface 701k within device 430 can provide connectivity to an IP network 401 through 3GPP standards such as 3G, 4G, 4G LTE, and 5G networks, or subsequent and similar standards including IEEE 802.11.

Device 430 may also optionally include user interface 701y which may include one or more sub-servers for receiving inputs and/or one or more sub-servers for conveying outputs. User interfaces may have limited functionality for devices 430 used with the "Internet of Things" such as intelligent sensor and may include a few LED lights or and LCD display. User interface 701y could comprise a touch screen or screen display with keyboard and mouse, if device 430 has sophisticated interaction with a user. For some embodiments, the user interface 701y can comprise a touch screen for a smartphone if device 430 comprises a smartphone. For embodiments where device 430 comprises a laptop or personal computer, then user interface 701y can include at least a keyboard, mouse, and display monitor or screen. Device 430 can optionally omit a user interface 201y, if no user input or display is required for establishing communications IP network 401 and server 101.

Although not depicted in FIG. 7, device 430 can include other components to support operation, such as a clock, power source or power connection, antennas, etc. Other possibilities exist as well for hardware and electrical components operating in a device 430 without departing from the scope of the present disclosure. Using the electrical components depicted in FIG. 7, a device 430 could send and receive the data in FIG. 4a, in order to conduct secure communications with at least one server 101.

CONCLUSION

Various exemplary embodiments have been described above. Those skilled in the art will understand, however, that changes and modifications may be made to those examples without departing from the scope of the claims.

The invention claimed is:

1. A method for a computing device to authenticate a server based on both a first digital signature algorithm and a second digital signature algorithm, the method performed by the computing device, the method comprising:
   a) storing in a nonvolatile memory (i) the first digital signature algorithm, and (ii) the second digital signature algorithm;
   b) transmitting, to the server, a message comprising a device key share for a key exchange algorithm;
   c) receiving, from the server, (i) a server key share, (ii) a first server certificate with a first set of parameters, (iii) a second server certificate with a second set of parameters, (iv) a first digital signature for first data comprising the device key share and the server key share, and (v) a second digital signature for second data comprising the first data and the first digital signature;
   d) verifying the first digital signature with (i) the received first server certificate, (ii) the first data, and (iii) the first digital signature algorithm;
   e) verifying the second digital signature with (i) the received second server certificate, (ii) the second data, and (iii) the second digital signature algorithm; and
   f) transmitting, to the server, encrypted application data.

2. The method of claim 1, wherein the key exchange algorithm comprises a key encapsulation mechanism.

3. The method of claim 1, wherein the first digital signature algorithm supports one of RSA cryptography and elliptic curve cryptography, and wherein the second digital signature algorithm supports post-quantum cryptography.

4. The method of claim 1, wherein the first digital signature algorithm supports post-quantum cryptography, and wherein the second digital signature algorithm supports one of RSA cryptography and elliptic curve cryptography.

5. The method of claim 1, wherein both the first digital signature algorithm and the second digital signature algorithm support post-quantum cryptography.

6. The method of claim 1, wherein the computing device comprises a processor, a random access memory (RAM), the nonvolatile memory, a network interface, and a system bus.

7. The method of claim 1, wherein the message includes (i) the first set of parameters for the first digital signature algorithm and (ii) the second set of parameters for the second digital signature algorithm.

8. The method of claim 1, wherein the message includes a random number generated by the computing device, and wherein the first data includes the random number.

9. A computing device for authenticating a server, the computing device comprising:
   a nonvolatile memory configured to store (i) a first digital signature algorithm, and (ii) a second digital signature algorithm;
   a network interface configured to transmit a message to the server a message comprising a device key share for a key exchange algorithm and receive, from the server, (i) a server key share, (ii) a first server certificate with a first set of parameters, (iii) a second server certificate with a second set of parameters, (iv) a first digital signature for first data comprising the device key share and the server key share, and (v) a second digital signature for second data comprising the first data and the first digital signature;
   a processor configured to:
      a) verify the first digital signature with (i) the received first server certificate, (ii) the first data, and (iii) the first digital signature algorithm; and
      b) verify the second digital signature with (i) the received second server certificate, (ii) the second data, and (iii) the second digital signature algorithm;
   a random access memory (RAM) configured to store computer executable instructions, the computer executable instructions configured to (i) generate a shared secret with a key derivation function for at least the first digital signature and the second digital signature, and (ii) encrypting application data using the shared secret; and
   a data bus configured to transfer, from the RAM to the network interface, a response for the server comprising the encrypted application data.

10. The computing device of claim 9, wherein the key exchange algorithm comprises a key encapsulation mechanism.

11. The computing device of claim 9, wherein the first digital signature algorithm supports one of RSA cryptography and elliptic curve cryptography, and wherein the second digital signature algorithm supports post-quantum cryptography.

12. The computing device of claim 9, wherein the first digital signature algorithm supports post-quantum cryptography, and wherein the second digital signature algorithm supports one of RSA cryptography and elliptic curve cryptography.

13. The computing device of claim 9, wherein both the first digital signature algorithm and the second digital signature algorithm support post-quantum cryptography.

14. The computing device of claim 9, further comprising a hardware random number generator configured to generate a random number, wherein the message includes the random number, and wherein the first data includes the random number.

15. The computing device of claim 9, wherein the message includes (i) the first set of parameters for the first digital signature algorithm and (ii) the second set of parameters for the second digital signature algorithm.

* * * * *